United States Patent
Short et al.

(10) Patent No.: US 10,367,748 B2
(45) Date of Patent: *Jul. 30, 2019

(54) SYSTEMS AND METHODS FOR DYNAMIC DATA TRANSFER MANAGEMENT ON A PER SUBSCRIBER BASIS IN A COMMUNICATIONS NETWORK

(71) Applicant: NOMADIX, INC., Agoura Hills, CA (US)

(72) Inventors: Joel E. Short, Los Angeles, CA (US); Frederic Delley, Agoura Hills, CA (US); Mark F. Logan, Agoura Hills, CA (US); Daniel Toomey, Agoura Hills, CA (US)

(73) Assignee: NOMADIX, INC., Agoura Hills, CA (US)

( * ) Notice: Subject to any disclaimer, the term of this patent is extended or adjusted under 35 U.S.C. 154(b) by 224 days.

This patent is subject to a terminal disclaimer.

(21) Appl. No.: 14/879,567

(22) Filed: Oct. 9, 2015

(65) Prior Publication Data
US 2016/0205031 A1    Jul. 14, 2016

Related U.S. Application Data

(63) Continuation of application No. 14/146,971, filed on Jan. 3, 2014, now Pat. No. 9,160,674, which is a
(Continued)

(51) Int. Cl.
*G06F 15/173* (2006.01)
*H04L 12/823* (2013.01)
(Continued)

(52) U.S. Cl.
CPC .............. *H04L 47/32* (2013.01); *H04L 12/14* (2013.01); *H04L 12/1403* (2013.01);
(Continued)

(58) Field of Classification Search
USPC ........ 709/226, 227, 232, 240, 224; 370/348, 370/352
See application file for complete search history.

(56) References Cited

U.S. PATENT DOCUMENTS

| | | |
|---|---|---|
| 5,113,499 A | 5/1992 | Ankney et al. |
| 5,446,735 A | 8/1995 | Tobagi et al. |

(Continued)

FOREIGN PATENT DOCUMENTS

| | | |
|---|---|---|
| CA | 2150215 | 11/1996 |
| CA | 2600760 | 9/2006 |

(Continued)

OTHER PUBLICATIONS

U.S. Appl. No. 60/054,687, filed Aug. 1, 1997, Nair et al.
(Continued)

*Primary Examiner* — Liang Che A Wang
(74) *Attorney, Agent, or Firm* — Knobbe Martens Olson & Bear, LLP

(57) ABSTRACT

A method of dynamically managing transmission of packets is disclosed. The method, in some embodiments, may comprise establishing a network session over a communication link between a network and a user device of a user and associating a data transmission parameter with the user device. The method may further comprise receiving a packet and calculating a delay period associated with the packet based on the data transmission parameter and delaying transmission of the packet based on the delay period.

18 Claims, 8 Drawing Sheets

Related U.S. Application Data continuation of application No. 13/094,769, filed on Apr. 26, 2011, now Pat. No. 8,626,922, which is a continuation of application No. 12/771,915, filed on Apr. 30, 2010, now Pat. No. 7,953,857, which is a continuation of application No. 09/693,481, filed on Oct. 20, 2000, now Pat. No. 7,739,383.

(60) Provisional application No. 60/161,182, filed on Oct. 22, 1999.

(51) Int. Cl.
*H04L 12/14* (2006.01)
*H04L 29/06* (2006.01)
*H04L 12/24* (2006.01)
*H04L 12/26* (2006.01)
*H04L 12/801* (2013.01)
*H04L 12/813* (2013.01)
*H04L 12/835* (2013.01)
*H04L 12/919* (2013.01)
*H04L 12/927* (2013.01)
*H04L 12/911* (2013.01)
*H04L 29/08* (2006.01)

(52) U.S. Cl.
CPC ......... *H04L 12/1439* (2013.01); *H04L 29/06* (2013.01); *H04L 41/0809* (2013.01); *H04L 41/0886* (2013.01); *H04L 41/0896* (2013.01); *H04L 43/00* (2013.01); *H04L 47/10* (2013.01); *H04L 47/14* (2013.01); *H04L 47/15* (2013.01); *H04L 47/20* (2013.01); *H04L 47/30* (2013.01); *H04L 47/70* (2013.01); *H04L 47/765* (2013.01); *H04L 47/808* (2013.01); *H04L 47/824* (2013.01); *H04L 63/0892* (2013.01); *H04L 67/02* (2013.01); *H04L 67/12* (2013.01); *H04L 67/306* (2013.01); *H04L 69/329* (2013.01); *H04L 41/5019* (2013.01); *H04L 43/0894* (2013.01); *H04L 63/10* (2013.01)

(56) References Cited

U.S. PATENT DOCUMENTS

| | | | |
|---|---|---|---|
| 5,475,740 A | 12/1995 | Biggs, Jr. et al. | |
| 5,608,446 A | 3/1997 | Carr et al. | |
| 5,623,492 A | 4/1997 | Teraslinna | |
| 5,623,601 A | 4/1997 | Vu | |
| 5,708,654 A | 1/1998 | Arndt | |
| 5,708,780 A | 1/1998 | Levergood et al. | |
| 5,732,078 A | 3/1998 | Arango | |
| 5,751,956 A | 5/1998 | Kirsch | |
| 5,787,483 A | 7/1998 | Jam et al. | |
| 5,793,978 A * | 8/1998 | Fowler .............. H04L 12/1886 709/201 | |
| 5,799,002 A | 8/1998 | Krishnan | |
| 5,802,310 A | 9/1998 | Rajaraman | |
| 5,802,320 A | 9/1998 | Baehr et al. | |
| 5,864,540 A | 1/1999 | Bonomi et al. | |
| 5,915,087 A | 6/1999 | Hammond et al. | |
| 5,978,387 A * | 11/1999 | Sherman ............. H04Q 3/0025 370/355 | |
| 5,987,430 A | 11/1999 | Van Horne et al. | |
| 6,006,264 A | 12/1999 | Colby et al. | |
| 6,009,475 A | 12/1999 | Shrader | |
| 6,035,405 A | 3/2000 | Gage et al. | |
| 6,078,953 A | 6/2000 | Vaid et al. | |
| 6,128,601 A | 10/2000 | Van Horne et al. | |
| 6,130,892 A | 10/2000 | Short et al. | |
| 6,147,976 A | 11/2000 | Shand et al. | |
| 6,151,598 A * | 11/2000 | Shaw .............. G06F 17/30731 | |
| 6,154,775 A | 11/2000 | Coss et al. | |
| 6,170,012 B1 | 1/2001 | Coss et al. | |
| 6,182,139 B1 | 1/2001 | Brendel | |
| 6,182,141 B1 | 1/2001 | Blum et al. | |
| 6,194,992 B1 | 2/2001 | Short et al. | |
| 6,226,677 B1 | 5/2001 | Slemmer | |
| 6,232,764 B1 | 5/2001 | Rettig et al. | |
| 6,233,686 B1 | 5/2001 | Zenchelsky et al. | |
| 6,256,674 B1 | 7/2001 | Manning et al. | |
| 6,286,045 B1 | 9/2001 | Griffiths et al. | |
| 6,286,046 B1 | 9/2001 | Bryant | |
| 6,307,836 B1 | 10/2001 | Jones et al. | |
| 6,310,886 B1 | 10/2001 | Barton | |
| 6,343,315 B1 | 1/2002 | Stoel et al. | |
| 6,389,462 B1 | 5/2002 | Cohen et al. | |
| 6,460,084 B1 | 10/2002 | Van Horne et al. | |
| 6,496,504 B1 | 12/2002 | Malik | |
| 6,567,857 B1 | 5/2003 | Gupta et al. | |
| 6,587,127 B1 * | 7/2003 | Leeke .............. G06Q 20/123 715/733 | |
| 6,587,433 B1 | 7/2003 | Borella et al. | |
| 6,604,087 B1 | 8/2003 | Kolls | |
| 6,609,153 B1 | 8/2003 | Salkewicz | |
| 6,618,355 B1 | 9/2003 | Gulliford et al. | |
| 6,636,891 B1 | 10/2003 | LeClair et al. | |
| 6,636,894 B1 | 10/2003 | Short et al. | |
| 6,650,963 B2 | 11/2003 | DiLorenzo | |
| 6,654,808 B1 | 11/2003 | Chuah | |
| 6,735,633 B1 | 5/2004 | Welch et al. | |
| 6,738,371 B1 | 5/2004 | Ayres | |
| 6,789,110 B1 | 9/2004 | Short | |
| 6,792,323 B2 | 9/2004 | Krzyzanowski et al. | |
| 6,795,852 B1 | 9/2004 | Kleinrock et al. | |
| 6,810,426 B2 | 10/2004 | Mysore et al. | |
| 6,826,694 B1 | 11/2004 | Dutta et al. | |
| 6,854,010 B1 | 2/2005 | Christian et al. | |
| 6,857,009 B1 | 2/2005 | Ferreria et al. | |
| 6,868,399 B1 | 3/2005 | Short et al. | |
| 7,006,440 B2 | 2/2006 | Agrawal et al. | |
| 7,010,303 B2 | 3/2006 | Lewis et al. | |
| 7,020,082 B2 | 3/2006 | Bhagavath et al. | |
| 7,076,544 B2 | 7/2006 | Katz et al. | |
| 7,088,727 B1 | 8/2006 | Short et al. | |
| 7,089,586 B2 | 8/2006 | Kilgore | |
| 7,117,526 B1 | 10/2006 | Short | |
| 7,123,613 B1 | 10/2006 | Chawla et al. | |
| 7,194,554 B1 | 3/2007 | Short et al. | |
| 7,197,556 B1 | 3/2007 | Short et al. | |
| 7,216,152 B2 | 5/2007 | Short et al. | |
| 7,233,997 B1 | 6/2007 | Leveridge et al. | |
| 7,283,803 B2 | 10/2007 | Karaoguz et al. | |
| 7,392,279 B1 | 6/2008 | Chandran et al. | |
| 7,502,841 B2 | 3/2009 | Small et al. | |
| 7,506,368 B1 | 3/2009 | Kersey et al. | |
| 7,554,995 B2 | 6/2009 | Short et al. | |
| 7,689,446 B2 | 3/2010 | Sagar | |
| 7,694,006 B2 | 4/2010 | Boic et al. | |
| 7,698,432 B2 | 4/2010 | Short et al. | |
| 7,702,279 B2 | 4/2010 | Ko et al. | |
| 7,739,383 B1 | 6/2010 | Short et al. | |
| 7,778,193 B2 | 8/2010 | Mizuno et al. | |
| 7,930,721 B1 | 4/2011 | Hernes | |
| 7,953,857 B2 | 5/2011 | Short et al. | |
| 8,056,125 B2 | 11/2011 | Hirose | |
| 8,170,123 B1 | 5/2012 | Hobgood et al. | |
| 8,230,466 B2 | 7/2012 | Cockrell et al. | |
| 8,245,276 B1 | 8/2012 | DeRosia et al. | |
| 8,266,266 B2 | 9/2012 | Short et al. | |
| 8,370,879 B2 | 2/2013 | Zerr et al. | |
| 8,370,937 B2 | 2/2013 | Gal et al. | |
| 8,543,665 B2 | 9/2013 | Ansari et al. | |
| 8,626,922 B2 | 1/2014 | Short et al. | |
| 8,782,165 B2 | 7/2014 | Fee et al. | |
| 8,813,138 B2 | 8/2014 | Warrick et al. | |
| 8,856,843 B1 | 10/2014 | Hubach et al. | |
| 9,131,266 B2 | 9/2015 | Guedalia et al. | |
| 9,160,674 B2 | 10/2015 | Short et al. | |
| 9,225,704 B1 | 12/2015 | Johansson et al. | |
| 9,350,815 B2 | 5/2016 | Agarwal et al. | |
| 9,438,567 B1 | 9/2016 | Barraclough et al. | |
| 9,594,846 B2 | 3/2017 | Pinto et al. | |

(56) References Cited

U.S. PATENT DOCUMENTS

| | | |
|---|---|---|
| 9,654,821 B2 | 5/2017 | Coburn, IV et al. |
| 9,706,241 B2 | 7/2017 | Felt et al. |
| 9,716,902 B2 | 7/2017 | Ogle et al. |
| 9,762,679 B2 | 9/2017 | Gast et al. |
| 9,769,056 B2 | 9/2017 | Gast et al. |
| 9,847,888 B2 | 12/2017 | Kannan et al. |
| 2002/0083344 A1 | 6/2002 | Vairavan |
| 2003/0140345 A1 | 7/2003 | Fisk et al. |
| 2004/0006615 A1 | 1/2004 | Jackson |
| 2004/0059815 A1 | 3/2004 | Buckingham et al. |
| 2004/0073704 A1 | 4/2004 | Paunikar et al. |
| 2004/0244031 A1 | 12/2004 | Martinez |
| 2005/0154766 A1 | 7/2005 | Huang et al. |
| 2005/0175014 A1 | 8/2005 | Patrick |
| 2005/0283791 A1 | 12/2005 | McCarthy et al. |
| 2006/0031436 A1 | 2/2006 | Sakata et al. |
| 2006/0239254 A1 | 10/2006 | Short et al. |
| 2007/0073728 A1 | 3/2007 | Klein, Jr. et al. |
| 2007/0143458 A1 | 6/2007 | Milligan et al. |
| 2007/0241990 A1 | 10/2007 | Smith et al. |
| 2007/0286100 A1 | 12/2007 | Saaranen et al. |
| 2008/0148383 A1 | 6/2008 | Pitchaikani et al. |
| 2008/0209479 A1 | 8/2008 | Zerr et al. |
| 2008/0263600 A1 | 10/2008 | Olague et al. |
| 2008/0295012 A1 | 11/2008 | Sloo et al. |
| 2009/0015723 A1 | 1/2009 | Doumuki |
| 2009/0024745 A1 | 1/2009 | Short et al. |
| 2009/0027222 A1 | 1/2009 | Larsson et al. |
| 2009/0064346 A1 | 3/2009 | Larsson et al. |
| 2009/0113537 A1 | 4/2009 | Woo |
| 2009/0125609 A1 | 5/2009 | Wood et al. |
| 2009/0144425 A1 | 6/2009 | Marr et al. |
| 2009/0228919 A1 | 9/2009 | Zott et al. |
| 2010/0057501 A1 | 3/2010 | Mohammed |
| 2010/0082784 A1 | 4/2010 | Rosenblatt et al. |
| 2010/0153576 A1 | 6/2010 | Wohlert et al. |
| 2010/0169935 A1 | 7/2010 | Abbruzzese |
| 2010/0250767 A1 | 9/2010 | Barreto et al. |
| 2010/0313225 A1 | 12/2010 | Cholas et al. |
| 2010/0325672 A1 | 12/2010 | Barnett, Jr. et al. |
| 2010/0332615 A1 | 12/2010 | Short et al. |
| 2011/0035466 A1 | 2/2011 | Panigrahi |
| 2011/0074794 A1 | 3/2011 | Felt et al. |
| 2011/0083193 A1 | 4/2011 | Howcroft et al. |
| 2011/0099589 A1 | 4/2011 | Woo et al. |
| 2011/0138069 A1 | 6/2011 | Momchilov et al. |
| 2011/0179106 A1 | 7/2011 | Hulse et al. |
| 2011/0200094 A1 | 8/2011 | Kalra et al. |
| 2011/0231903 A1 | 9/2011 | Springer |
| 2011/0296501 A1 | 12/2011 | Drovdahl et al. |
| 2011/0302607 A1 | 12/2011 | Warrick et al. |
| 2012/0011033 A1 | 1/2012 | Salgia |
| 2012/0021684 A1 | 1/2012 | Schultz et al. |
| 2012/0050012 A1 | 3/2012 | Alsina et al. |
| 2012/0162351 A1 | 6/2012 | Feldman et al. |
| 2012/0174163 A1 | 7/2012 | Moorthy et al. |
| 2012/0239775 A1 | 9/2012 | Hubbard et al. |
| 2012/0254793 A1 | 10/2012 | Briand et al. |
| 2012/0324076 A1 | 12/2012 | Zerr et al. |
| 2012/0324517 A1 | 12/2012 | Ogle et al. |
| 2013/0024880 A1 | 1/2013 | Moloney-Egnatios et al. |
| 2013/0055324 A1 | 2/2013 | Ostlund |
| 2013/0074106 A1 | 3/2013 | Hayashi et al. |
| 2013/0173694 A1 | 7/2013 | Arsenault |
| 2013/0174021 A1 | 7/2013 | Buchwald et al. |
| 2013/0179931 A1 | 7/2013 | Osorio et al. |
| 2013/0212656 A1 | 8/2013 | Ranade et al. |
| 2013/0290465 A1 | 10/2013 | Harrison et al. |
| 2013/0301429 A1 | 11/2013 | Peters et al. |
| 2013/0318205 A1 | 11/2013 | N et al. |
| 2013/0347025 A1 | 12/2013 | Prakash et al. |
| 2014/0053054 A1 | 2/2014 | Shen et al. |
| 2014/0172946 A1 | 6/2014 | Hershberg et al. |
| 2014/0258366 A1 | 9/2014 | L'Heureux et al. |
| 2017/0163724 A1 | 6/2017 | Puri et al. |

FOREIGN PATENT DOCUMENTS

| | | |
|---|---|---|
| CA | 2707202 | 12/2010 |
| CA | 2709651 | 12/2010 |
| CA | 2750345 | 12/2011 |
| CA | 2790354 | 3/2013 |
| CA | 2817932 | 12/2013 |
| CN | 101848211 | 9/2010 |
| CN | 202488617 | 10/2012 |
| EP | 0 573 739 | 12/1993 |
| EP | 0 742 657 | 11/1996 |
| EP | 0 767 595 | 4/1997 |
| EP | 0 873 037 | 10/1998 |
| EP | 0 901 301 | 3/1999 |
| EP | 0783353 | 1/2001 |
| EP | 1521183 | 4/2005 |
| EP | 1 819 108 | 8/2007 |
| EP | 1 855 429 | 11/2007 |
| EP | 2071506 | 6/2009 |
| EP | 245909 | 9/2012 |
| ES | 2302588 | 7/2008 |
| GB | 2 311 439 | 9/1997 |
| WO | WO 97/002687 | 1/1997 |
| WO | WO 97/022936 | 6/1997 |
| WO | WO 98/016036 | 4/1998 |
| WO | WO 98/054868 | 12/1998 |
| WO | WO 01/031861 | 5/2001 |
| WO | WO 01/31885 | 5/2001 |
| WO | WO 2001/031861 | 5/2001 |
| WO | WO 2004/036371 | 4/2004 |
| WO | WO 2008/108699 | 9/2008 |
| WO | WO 2012/032013 | 3/2012 |
| WO | WO2012/072105 | 6/2012 |

OTHER PUBLICATIONS

U.S. Appl. No. 60/109,878, filed Nov. 25, 1998, Slemmer.

"26th Annual HITEC® set for Jun. 16-18 In Los Angeles", http://www.hospitalitynet.org/news/4000506.html, Austin, TX, Jan. 14, 1998, pp. 4.

Anderson et al., "The Magicrouter, an Application of Fast Packet Interposing," May 17, 1996, pp. 1-12.

Appenzeller, et al., "User-Friendly Access Control for Public Network Ports," Department of Computer Science, Stanford University, Aug. 31, 1998, pp. 8.

"ATCOM/INFO Announces IPORT 2.5 for High-Speed Internet Access," Business Wire, Oct. 21, 1998.

"ATCOM/INFO Releases IPORT Central Office Solution", Business Wire, Oct. 21, 1998, pp. 5.

"ATCOM/INFO's IPORT Brings High Speed Internet Access to Hotels in Japan and Mexico; ATCOM and TUT Systems Partner to Expand International Presence of 'Plug and Play' Internet Access", http://www.hospitalitynet.org/news/4002028.print, May 11, 1999. pp. 2.

AT&T, "INTUITY Lodging Property Management System Specifications", 585-310-234, Issue 1, Dec. 1995, pp. 126.

Braden et al., "Report of IAB Workshop on Security in the Internet Architecture", Network Working Group, RFC 1636, Jun. 1994, pp. 52.

Breidenbach, Susan, "High-tech Hospitality," Network World, Mar. 30, 1998, vol. 15, No. 13. pp. 1, 43-44 & 46-47.

Chatel, M.: "Classical Versus Transparent IP Proxies" Network Working Group, RFC 1919, Mar. 1, 1996, pp. 35.

"Elastic Networks Unveils YesWare; Mobility Software Solution Targets Visitor-Based Networking", PR Newswire, Apr. 12, 1999, pp. 2.

Estrin, "Visa Scheme for Inter-Organization Network Security", 1987, pp. 174-183.

FreeBSD, "FreeBSD 4.5-Release", http://www.freebsd.org/cgi/man.cgi?query=dummynet&apropos=08tsektion=484manpath=FreeBSD+4.5-RELEASE&arch=default&format=html, Sep. 28, 1998, pp. 5.

Hamblen, Matt, "Hotel Tests Ethernet Access on Phone Lines: YesWare Aims to Cut Web Costs for Guests, Bolster Hotel Revenue", ComputerWorld, Apr. 19, 1999, vol. 33, No. 16, p. 81.

(56) References Cited

OTHER PUBLICATIONS

Hluchyj et al., "Queueing Disciplines for Integrated Fast Packet Networks," SUPERCOMM/ICC '92, Discovering a New World of Communications, Jun. 14-18, 1992, pp. 0990-0996.
"IPORT™ Internet Access System: IPORT Central Office Solution", ATCOM/INFO, White Paper, Nov. 1998, pp. 22.
IPORT Internet Access System, Installation Guide, 1997-1999 ATCOM, INC., pp. 222.
IPORT Internet Access System, Installation Guide, New Version. 4.0, date Unknown, pp. 330.
IPORT, User's Guide to Installing IPORT Server, ATCOM/INFO, Apr. 9, 1999 in 22 pp.
Kalkbrenner et al., "Quality of Service (QoS) in Distributed Hypermedia-Systems," Jul. 1995, IEEE, v 10-8186-7180, pp. 529-534.
Kausar et al., "A Charging Model for Sessions on the Internet," European Conference on Multimedia Applications, Services and Techniques, Department of Computer Science, University College London, 1999, pp. 246-261.
"LodgeNet Acquires Connect Group Delivers High—Speed Laptop Connectivity", Hotel Online Press Releases, Sioux Falls, SD, Jun. 16, 1998, pp. 2.
Lynch, Clifford, "A White Paper on Authentication and Access Management Issued in Cross-Organizational Use of Networked Information Resources", Spring CNI Task Force Meeting, Washington, D.C., Apr. 14, 1998, pp. 18.
Micros•Fidelio, "Interface Application Specification", V1.11, Jan. 1998, pp. 42.
Microsoft, "Microsoft Awards Hospitality Industry's Top Software Developers", http://news.microsoft.com/1998/06/17/microsoft-awards-hospitality-industrys-top-software-developers/, News Center, Jun. 17, 1998, pp. 6.
NEC, "Property Management System: Communication Interface Specification", NEC America, Inc., NDA-30115-001, Revision 1.0, Jun. 1998, pp. 116.
Qu et al., "A Mobile TCP Socket", The Australian National University, TR-CS-97-08, Apr. 1997, pp. 26.
Richards et al., "Mapping User Level QOS from a Single Parameter," 1998, pp. 1-15.
Rigney, C., "Radius Accounting," Network Working Group, RFC 2139, Apr. 1997, pp. 23.
Rizzo, Luigi, "Dummynet: A Simple Approach to the Evaluation of Network Protocols," ACM Computer Communication Review, vol. 27, No. 1, Jan. 1997, pp. 31-41.
Rupp et al., "INDEX: A Platform for Determining how People Value the Quality of their Internet Access," Proceedings of the Sixth IEEE/IFIP International Workshop on Quality of Service, May 1998, pp. 85-90.
Stevens, "TCP/IP Illustrated, vol. 1: The Protocols" Addison-Wesley Professional Computing Series, Jul. 2001, pp. 53-62 & 231-235.
"STSN Announces Exclusive Agreement as Marriott International's High-Speed Internet Service Provider", http://www.hospitalitynet.org/news/4003025.html, Sep. 2, 1999, pp. 1.
Tanenbaum, Andrew S., "Computer Networks" Prentice Hall of India, 3rd Edition, May 2000, Chapter 5, Section 3, pp. 380-384.
Tanenbaum, Andrew S., "Computer Networks" Prentice Hall of India, 3rd Edition, May 2000, Chapter 5, Section 5, pp. 420-424.
"Tut Systems Acquires Public Port, Inc.", PR Newswire, Jun. 8, 1999, pp. 2.
"Tut Systems Launches Hotel Internet Management System, PublicPort (TM) Latest Addition to Multi-Tenant Unit Product Line Allows Hotel Owners to Use Existing Copper Infrastructure to Provide 'Plug and Play' Internet Services", Hospitality Net, Jun. 23, 1999, pp. 3, http://www.hospitalitynet.org/news/4002299.print.
WiredHotelier.com, "ATCOM/INFO Makes High-Speed Internet Access to Corporate Networks Secure for Business Travelers", http://www.wiredhotelier.com/news//4002246.html, Jun. 17, 1999, pp. 2.

Case No. 07-1946 DDP (VBKx) Nomadix, Inc. v. Second Rule LLC, Plaintiff Nomadix Inc.'s Proposed Claim Construction Statement, dated May 23, 2008 in 184 pages.
Case No. 07-1946 DDP (VBKx) Nomadix, Inc. v. Second Rule LLC, Proposed Joint Claim Construction Statement dated Jul. 2, 2008 in 31 pages.
Case No. 07-1946 GPS (VBK) Nomadix, Inc. v. Second Rule LLC, Complaint for Patent Infringement of U.S. Pat. No. 6,130,892; 7,088,727; 6,636,894; 6,857,009, and 6,868,399 dated Mar. 23, 2007 in 11 pages.
Case No. 07-1946 GPS (VBK) Nomadix, Inc. v. Second Rule LLC, Second Rule LLC's Response to Nomadix, Inc.'s Proposed Claim Construction Statement dated Jun. 6, 2008 in 74 pages.
Case No. 2:14-cv-08256 DDP (VBKx), Nomadix, Inc. v. Hospitality Core Services LLC, d/b/a Blueprint RF, [089] Nomadix's Reply Brief on its Motion for Summary Judgment of Infringement of the '246 Patent, dated Aug. 17, 2015 in 34 pages.
Case No. 2:14-cv-08256 DDP (VBKx), Nomadix, Inc. v. Hospitality Core Services LLC, d/b/a Blueprint RF, [090] Supplemental Declaration of Dr. Stuart Stubblebine in Support of Nomadix's Motion for Summary Judgement of Infringement of the '246 Patent, dated Aug. 17, 2015 in 25 pages.
Case No. 2:14-cv-08256 DDP (VBKx), Nomadix, Inc. v. Hospitality Core Services LLC, d/b/a Blueprint RF, [093] Opposition to Nomadix's Motion for Partial Summary Judgment of Infringement of '246 Patent and Cross-Motion for Judgment of Non-Infringement Statement of Genuine Disputes of Material, dated Aug. 19, 2015 in 4 pages.
Case No. 2:14-cv-08256 DDP (VBKx), Nomadix, Inc. v. Hospitality Core Services LLC, d/b/a Blueprint RF, [72-2] Nomadix's Statement of Uncontroverted Facts and Conclusions of Law in Support of its Motion for Summary Judgment of Infringement of the '246 Patent, dated Jul. 30, 2015 in 5 pages.
Case No. 2:14-cv-08256 DDP (VBKx), Nomadix, Inc. v. Hospitality Core Services LLC, d/b/a Blueprint RF, [74] Declaration of Mark Lezama in Support of Nomadix's Motion for Summary Judgment of Infringement of the '246 Patent, dated Jul. 30, 2015 in 212 pages.
Case No. 2:14-cv-08256 DDP (VBKx), Nomadix, Inc. v. Hospitality Core Services LLC, d/b/a Blueprint RF, [79] Nomadix's Opening Brief on its Motion for Summary Judgment of Infringement of the '246 Patent, dated Jul. 30, 2015 in 32 pages.
Case No. 2:14-cv-08256 DDP (VBKx), Nomadix, Inc. v. Hospitality Core Services LLC, d/b/a Blueprint RF, [80] Memorandum in Support of Motion for Partial Summary Judgment of Patent Invalidity Under 35 § 112 and Double Patenting, dated Aug. 6, 2015 in 186 pages. (Part 1 of 2).
Case No. 2:14-cv-08256 DDP (VBKx), Nomadix, Inc. v. Hospitality Core Services LLC, d/b/a Blueprint RF, [80] Memorandum in Support of Motion for Partial Summary Judgment of Patent Invalidity Under 35 § 112 and Double Patenting, dated Aug. 6, 2015 in 187 pages. (Part 2 of 2).
Case No. 2:14-cv-08256 DDP (VBKx), Nomadix, Inc. v. Hospitality Core Services LLC, d/b/a Blueprint RF, [82] Statement of Uncontested Facts and Conclusions of Law, dated Aug. 6, 2015 in 12 pages.
Case No. 2:14-cv-08256 DDP (VBKx), Nomadix, Inc. v. Hospitality Core Services LLC, d/b/a Blueprint RF, [83] Opposition to Nomadix's Motion for Partial Summary Judgment of Infringement of '246 Patent and Cross-Motion for Judgment of Non-Infringement, dated Aug. 7, 2015 in 105 pages.
Case No. 2:14-cv-08256 DDP (VBKx), Nomadix, Inc. v. Hospitality Core Services LLC, d/b/a Blueprint RF, [84] Opposition to Nomadix's Motion for Partial Summary Judgment of Infringement of 246 Patent and Cross-Motion for Judgment of Non-Infringement Statement of Facts and Conclusions of Law, dated Aug. 7, 2015 in 12 pages.
Case No. 2:14-cv-08256 DDP (VBKx), Nomadix, Inc. v. Hospitality Core Services LLC, d/b/a Blueprint RF, [86] Opposition to Nomadix's Motion for Partial Summary Judgment of Infringement of 246 Patent and Cross-Motion for Judgment of Non-Infringement Statement of Facts and Conclusions of Law, dated Aug. 8, 2015 in 11 pages.

(56) References Cited

OTHER PUBLICATIONS

Case No. 2:14-cv-08256 DDP (VBKx), Nomadix, Inc. v. Hospitality Core Services LLC, d/b/a Blueprint RF, [87] Memorandum in Support of Motion for Partial Summary Judgment of Patent Invalidity Under 35 U.S.C. §§ 102 and 103, dated Aug. 12, 2015 in 198 pages. (Part 3 of 3).
Case No. 2:14-cv-08256 DDP (VBKx), Nomadix, Inc. v. Hospitality Core Services LLC, d/b/a Blueprint RF, [87] Memorandum in Support of Motion for Partial Summary Judgment of Patent Invalidity Under 35 U.S.C. §§ 102 and 103, dated Aug. 12, 2015 in 200 pages. (Part 1 of 3).
Case No. 2:14-cv-08256 DDP (VBKx), Nomadix, Inc. v. Hospitality Core Services LLC, d/b/a Blueprint RF, [87] Memorandum in Support of Motion for Partial Summary Judgment of Patent Invalidity Under 35 U.S.C. §§ 102 and 103, dated Aug. 12, 2015 in 204 pages. (Part 2 of 3).
Case No. 2:14-cv-08256 DDP (VBKx), Nomadix, Inc. v. Hospitality Core Services LLC, d/b/a Blueprint RF, [88-1] Memorandum in Support of Motion for Partial Summary Judgment of Patent Invalidity Under 35 U.S.C. §§ 102 and 103, dated Aug. 12, 2015 in 20 pages.
Case No. 2:14-cv-08256 DDP (VBKx), Nomadix, Inc. v. Hospitality Core Services LLC, d/b/a Blueprint RF, Defendant's Third Supplemental Responses to Plaintiff's First Interrogatories, dated Aug. 3, 2015 in 7 pages.
Case No. 2:14-cv-08256 DDP (VBKx), Nomadix, Inc. v. Hospitality Core Services LLC, d/b/a Blueprint RF, MSL-Declaration of Julian Elischer, dated Aug. 21, 2015 in 8 pages.
Case No. 2:14-cv-08256 DDP (VBKx), Nomadix, Inc. v. Hospitality Core Services LLC, d/b/a Blueprint RF, Nomadix's First Supplemental Response to Blueprints RF's Interrogatory 6, dated Aug. 8, 2015 in 6 pages.
Case No. 2:14-cv-08256 DDP (VBKx), Nomadix, Inc. v. Hospitality Core Services LLC, d/b/a Blueprint RF, Nomadix's First Supplemental Responses to Blueprint RF's Interrogatories 11 and 12, dated Aug. 8, 2015 in 42 pages.
Case No. 2:14-cv-08256 DDP (VBKx), Nomadix, Inc. v. Hospitality Core Services LLC, d/b/a Blueprint RF, Nomadix's Response to Blueprint RF's Third Interrogatories (17-21), dated Aug. 13, 2015 in 19 pages.
Case No. 2:14-cv-08256 DDP (VBKx), Nomadix, Inc. v. Hospitality Core Services LLC, d/b/a Blueprint RF, Nomadix's Response to Blueprint RF's Third Requests for Admission (76-107), dated Aug. 13, 2015 in 23 pages.
Case No. 2:14-cv-08256-RGKJEMx, Nomadix, Inc., v. Hospitality Core Services LLC, d/b/a Blueprint RF, Notice of Motion to Dismiss, Memorandum in Support of Motion to Dismiss and Proposed Order dated Nov. 19, 2014 in 29 pages.
Case No. CV 09-8441 (C.D. Cal. 2009), Nomadix, Inc. v. Hewlett-Packard Co., Complaint for Patent Infringement of U.S. Pat. No. 6,130,892; 7,088,727; 7,554,995; 6,636,894; 7,195,554; 6,868,399 and 6,789,110 dated Nov. 17, 2009 in 189 pages.
Case No. CV14-08256 DDP (VBKx), Nomadix, Inc., v. Hospitality Core Services LLC, d/b/a Blueprint RF, Answer, Affirmative Defenses and Counterclaims and Demand for Jury Trial dated Apr. 17, 2015 in 34 pages.
Case No. CV14-08256 Ddp (VBKx), Nomadix, Inc., v. Hospitality Core Services LLC, d/b/a Blueprint RF, First Amended Answer, Affirmative Defenses and Counterclaims and Demand for Jury Trial dated May 1, 2015 in 42 pages.
Case No. CV14-08256 DDP (VBKx), Nomadix, Inc., v. Hospitality Core Services LLC, d/b/a Blueprint RF, First Amended Complaint and Demand for Jury Trial dated Dec. 19, 2014 in 26 pages.
Case No. CV14-08256 DDP (VBKx), Nomadix, Inc., v. Hospitality Core Services LLC, d/b/a Blueprint RF, Nomadix's Opposition to Defendant's Motion to Dismiss Under Rule 12(b)(6) and 35 U.S.C. § 101 [including Appendix A & B] dated Feb. 9, 2015 in 77 pages.
Case No. CV14-08256 DDP (VBKx), Nomadix, Inc., v. Hospitality Core Services LLC, d/b/a Blueprint RF, Notice of Motion to Dismiss Under Rule 12(b)(6) dated Jan. 12, 2015 in 133 pages. [Document Nos. 34 to 34-11].
Case No. CV14-08256 DDP (VBKx), Nomadix, Inc., v. Hospitality Core Services LLC, d/b/a Blueprint RF, Notice of Renewed Motion to Dismiss Under Rule 12(b) (6) and 35 U.S.C. §§ 271(b), (c) and (f), Memorandum in Support of Renewed Motion to Dismiss Under Rule 12(b) (6) and 35 U.S.C. §§ 271(b), (c) and (f) [including exhibits A-I] and Granting Renewed Motion to Dismiss Under Rule 12(b) (6) and 35 U.S.C. §§ 271(b), (c) and (f) dated Jan. 12, 2015 in 139 pages. [Document Nos. 35 to 35-11].
Case No. CV14-08256 DDP (VBKx), Nomadix, Inc., v. Hospitality Core Services LLC, d/b/a Blueprint RF, Opposition of Plaintiff Nomadix, Inc. to Renewed Motion of Defendant Blueprint RF to Dismiss Under Rule 12(b)(6) and 35 U.S.C. § 271(b), (c), and (f) dated Feb. 9, 2015 in 24 pages.
Case No. CV14-08256 DDP (VBKx), Nomadix, Inc., v. Hospitality Core Services LLC, d/b/a Blueprint RF, Order on Motions to Dismiss dated Apr. 3, 2015 in 11 pages.
Case No. CV14-08256 DDP (VBKx), Nomadix, Inc., v. Hospitality Core Services LLC, d/b/a Blueprint RF, Reply in Support Motion to Dismiss Under Rule 12(b) (6) and 35 U.S.C. § 101 dated Feb. 23, 2015 in 22 pages.
Case No. CV14-08256 DDP (VBKx), Nomadix, Inc., v. Hospitality Core Services LLC, d/b/a Blueprint RF, Reply in Support Motion to Dismiss Under Rule 12(b) (6) and 35 U.S.C. §§ 271(b), (c) and (f) dated Feb. 23, 2015 in 22 pages.
Claim Charts, Defendant's Contentions relating to Case No. CACD 14-cv-08256, Nomadix v. Hospitality Core Services, re: U.S. Pat. No. 6,636,894 in 9 pages, dated Oct. 24, 2014.
Claim Charts, Defendant's Contentions relating to Case No. CACD 14-cv-08256, Nomadix v. Hospitality Core Services, re: U.S. Pat. No. 6,868,399 in 11 pages, dated Oct. 24, 2014.
Claim Charts, Defendant's Contentions relating to Case No. CACD 14-cv-08256, Nomadix v. Hospitality Core Services, re: U.S. Pat. No. 8,156,246 in 9 pages, dated Oct. 24, 2014.
Claim Charts, Defendant's Contentions relating to Case No. CACD 14-cv-08256, Nomadix v. Hospitality Core Services, re: U.S. Pat. No. 8,266,266 in 14 pages, dated Oct. 24, 2014.
Claim Charts, Defendant's Contentions relating to Case No. CACD 14-cv-08256, Nomadix v. Hospitality Core Services, re: U.S. Pat. No. 8,266,269 in 10 pages, dated Oct. 24, 2014.
Claim Charts, Defendant's Contentions relating to Case No. CACD 14-cv-08256, Nomadix v. Hospitality Core Services, re: U.S. Pat. No. 8,364,806 in 10 pages, dated Oct. 24, 2014.
Claim Charts, Defendant's Contentions relating to Case No. CACD 14-cv-08256, Nomadix v. Hospitality Core Services, re: U.S. Pat. No. 8,788,690 in 13 pages, dated Oct. 24, 2014.
Commented Dominion Source Code Excerpts dated Aug. 4, 2015 in 4 pages.
Defendants' Supplemental Joint Invalidity Contentions, NOMADIX, Inc. v. Hewlett-Packard Company, et al., Case No. 09-CV-8441 DDP (VBKx) and Nomadix, Inc. v. Solutioninc Technologies Limited, Case No. 2:10-CV-00381 DDP (VBKx), (Central District of California, Western Division), dated Jul. 22, 2011 in 24 pages.
Exhibit 13, Claim Construction Table sent Aug. 3, 2015 in 1 page.
Exhibit A, Asserted Claims, filed in Defendants' Supplemental Joint Invalidity Contentions, Nomadix, Inc' v. Hewlett-Packard Company, et al., Case No. 09-CV-8441 DDP (VBKx) and Nomadix, Inc. v. Solutionic Technologies Limited, Case No. 2:10-CV-00381 DDP (VBKx), (Central District of California, Western Division), and dated Jul. 22, 2011, in 2 pages.
Exhibit B, Supplemental Prior Art List filed in Defendants' Supplemental Joint Invalidity Contentions, Nomadix, Inc. v. Hewlett-Packard Company, et al., Case No. 09-CV-8441 DDP (VBKx) and Nomadix, Inc. v. Solutionic Technologies Limited, Case No. 2:10-Cv-00381 DDP (VBKx), (Central District of California, Western Division), and dated Jul. 22, 2011, in 2 pages.
Exhibit C1, Claim Comparison for U.S. Pat. No. 6,130,892 filed in Defendants' Supplemental Joint Invalidity Contentions, Nomadix, Inc. v. Hewlett-Packard Company, et al., Case No. 09-CV-8441 DDP (VBKx) and Nomadix, Inc. v. Solutionic Technologies Lim-

(56) References Cited

OTHER PUBLICATIONS ited, Case No. 2:10-CV-00381 DDP (VBKx), (Central District of California, Western Division), and dated Jul. 22, 2011, in 4 pages.
Exhibit C2, Claim Comparison for U.S. Pat. No. 7,088,727 filed in Defendants' Supplemental Joint Invalidity Contentions, Nomadix, Inc. v. Hewlett-Packard Company, et al., Case No. 09-CV-8441 DDP (VBKx) and Nomadix, Inc. v. Solutionic Technologies Limited, Case No. 2:10-CV-00381 DDP (VBKx), (Central District of California, Western Division), and dated Jul. 22, 2011, in 7 pages.
Exhibit C3, Claim Comparison for U.S. Pat. No. 7,554,995 filed in Defendants' Supplemental Joint Invalidity Contentions, Nomadix, Inc. v. Hewlett-Packard Company, et al., Case No. 09-CV-8441 DDP (VBKx) and Nomadix, Inc. v. Solutionic Technologies Limited, Case No. 2:10-CV-00381 DDP (VBKx), (Central District of California, Western Division), and dated Jul. 22, 2011, in 25 pages.
Exhibit C4, Claim Comparison for U.S. Pat. No. 6,636,894, filed in Defendants' Supplemental Joint Invalidity Contentions, Nomadix, Inc. v. Hewlett-Packard Company, et al., Case No. 09-CV-8441 DDP (VBKx) and Nomadix, Inc. v. Solutionic Technologies Limited, Case No. 2:10-CV-00381 DDP (VBKx), (Central District of California, Western Division, and dated Jul. 22, 2011, in 18 pages.
Exhibit C5, Claim Comparison for U.S. Pat. No. 7,194,554 filed in Defendants' Supplemental Joint Invalidity Contentions, Nomadix, Inc. v. Hewlett-Packard Company, et al., Case No. 09-CV-8441 DDP (VBKx) and Nomadix, Inc. v. Solutionic Technologies Limited, Case No. 2:10-CV-00381 DDP (VBKx), (Central District of California, Western Division, and dated Jul. 22, 2011, in 18 pages.
Exhibit C6, Claim Comparison for U.S. Pat. No. 6,868,399 filed in Defendants' Supplemental Joint Invalidity Contentions, Nomadix, Inc. v. Hewlett-Packard Company, et al., Case No. 09-CV-8441 DDP (VBKx) and Nomadix, Inc. v. Solutionic Technologies Limited, Case No. 2:10-CV-00381 DDP (VBKx), (Central District of California, Western Division, and dated Jul. 22, 2011, in 22 pages.
Exhibit C7, U.S. Pat. No. 7,689,716 filed in Defendants' Supplemental Joint Invalidity Contentions, Nomadix, Inc. v. Hewlett-Packard Company, et al., Case No. 09-CV-8441 DDP (VBKx) and Nomadix, Inc. v. Solutionic Technologies Limited, Case No. 2:10-CV-00381 DDP (VBKx), (Central District of California, Western Division, and dated Jul. 22, 2011, in 11 pages.
Nomadix, Inc.'s Amended Answer to iBahn General Holdings Corporation's Complaint and Counterclaims, Nomdadix, Inc. v. iBahn General Holdings Corporation, (District of California, Case No. CV11-02604 DDP (VBKx), filed May 2, 2011 in 24 pages.
Notification of Concurrent Litigation and Information in Case No. 2:14-CV-08256 titled Complaint for Infringement of U.S. Pat. No. 6,636,894; 6,868,399; 7,698,432; 7,953,857; 8,156,246; 8,266,266; 8,266,269; 8,364,806; 8,725,888; and 8,788,690 and Demand for Jury Trial dated Oct. 24, 2014 in 21 pages.
Decision on Appeal dated Nov. 3, 2009, for U.S. Appl. No. 09/693,481, filed Oct. 20, 2000.
European Search Report in Application No. EP 07100293, dated Dec. 2, 2009 in 4 pages.
International Search Report and Written Opinion in PCT Application No. PCT/US00/29172, dated Mar. 14, 2001 in 2 pages.
Office Action dated Aug. 21, 2006, in U.S. Appl. No. 09/693,481, filed Oct. 20, 2006.
Office Action dated Dec. 21, 2006, in U.S. Appl. No. 09/693,481, filed Oct. 20, 2000.
Office Action dated Mar. 1, 2006, in U.S. Appl. No. 09/693,481, filed Oct. 20, 2006.
Office Action dated Mar. 17, 2004, in U.S. Appl. No. 09/693,481, filed Oct. 20, 2000.
Office Action dated May 4, 2005, in U.S. Appl. No. 09/693,481, filed Oct. 20, 2006.
Office Action dated Nov. 23, 2009, in U.S. Appl. No. 09/693,481, filed Oct. 20, 2000.
Office Action dated Sep. 28, 2004, in U.S. Appl. No. 09/693,481, filed Oct. 20, 2006.
Official Communication in Application No. EP 07100292, dated Feb. 7, 2011 in 5 pages.

Past, present and future office actions, amendments, arguments, and other relevant document or materials in the file history in co-pending U.S. Appl. No. 09/693,481, filed Oct. 20, 2000, entitled Systems and Methods for Dynamic Bandwidth Management on a Per Subscriber Basis in a Communications Network.
Past, present and future office actions, amendments, arguments, and other relevant document or materials in the file history in co-pending U.S. Appl. No. 12/579,820, filed Oct. 15, 2009, entitled Systems and Methods for Dynamic Bandwidth Management on a Per Subscriber Basis in a Communications Network.
Past, present and future office actions, amendments, arguments, and other relevant document or materials in the file history in co-pending U.S. Appl. No. 12/771,915, filed Apr. 30, 2010, entitled Systems and Method for Dynamic Transfer Management on a Per Subscriber Basis in a Communications Network.
"1stUp.com and Solid Oak Software Team to Offer Discounted Parental Control Software to 1stUp.com—affiliated Users", Business Wire, Lexis Nexis, Aug. 20, 1999. pp. 2.
"1stUp.com Debuts Industry's First Ad-Supported Internet Access Solution for Businesses; Alta Vista First Customer to Implement Groundbreaking Technology", Business Wire, Lexis Nexis, Jul. 20, 1999. pp. 3.
"4th Network Introduces High Speed Internet Notebook Connectivity Service at Hyatt Airport Hotel in Silicon Valley", Business Wire, Lexis Nexis, May 12, 1998, pp. 2.
"ATCOM/INFO Announces Agreements With Canada Payphone Corporation and KING Products to Provide New Public Internet Terminals Across Canada" Business Wire, Lexis Nexis, Jun. 8, 1998, pp. 2.
"ATCOM/INFO Announces Software Development Partnership with Elo TouchSystems," Business Wire, Lexis Nexis, Aug. 30, 1999, pp. 2.
"ATCOM/INFO CEO Named First Annual Arnie Karush Award Winner by San Diego Software Industry Council", Business Wire, Lexis Nexis, Oct. 13, 1998, pp. 2.
"ATCOM/INFO Makes High-Speed Internet Access to Corporate Networks Secure for Business Travelers", Business Wire, Lexis Nexis, Jun. 16, 1999, pp. 2.
"ATCOM/INFO Names Stephen Nye Chief Executive Officer", Business Wire, Lexis Nexis, Jan. 11, 1999, pp. 2.
"ATCOM/INFO Partners with NCR Corporation to Deliver Public Internet Kiosk Software," Business Wire, Lexis Nexis, Aug. 23, 1999, pp. 2.
"ATCOM/INFO Solution to Support and Maintain Mail Boxes Etc. Computer Time Rental Workstations", Business Wire, Lexis Nexis, Dec. 21, 1998, pp. 2.
"ATCOM/INFO to Display High-Speed Plug-And-Play Internet Access Software with Microsoft at HITEC", Business Wire, Lexis Nexis, Jun. 22, 1999, pp. 2.
"ATCOM/Info's IPORT Brings High Speed Internet Access to Hotels in Japan and Mexico; ATCOM and Tut Systems Partner to Expand International Presence of 'Plug and Play' Internet Access", Business Wire, Lexis Nexis, May 10, 1999, pp. 3.
"BBBOnLine Awards 100th Internet Privacy Seal; AT&T Joins Other Online Leaders Receiving Privacy Seal", Business Wire, LexisNexis, Sep. 22, 1999, pp. 2.
Blueprint RF, "Blueprint RF Advances Hotel Conference Services Delivery with New IRIS Conference Management Application", Jul. 2, 2015 in 1 page.
Blueprint RF, "Blueprint RF Defends Hospitality Industry in Battle Against Nomadix", Dec. 16, 2014 in 1 page.
Blueprint RF, "Blueprint RF is Named a Choice Hotels Preferred Vendor", Jun. 23, 2015 in 2 pages.
Blueprint RF, "Blueprint RF Reaffirms Stand Against Nomadix Gateway Server Technology Lawsuit", Dec. 17, 2014 in 1 page.
Blueprint RF, "Club Magnolia Connects to the Masters Golf Tournament with Blueprint RF", Mar. 23, 2015 in 1 page.
Blueprint RF, "Dominion. Next Generation HSIA Platform", <http://blueprintrf.com/img/slick.jpg> as printed Feb. 26, 2013 in 1 page.
Blueprint RF, "Executive Summary", as printed Feb. 17, 2015 in 8 pages.
Blueprint RF, "Executive Summary", as printed Jun. 14, 2015 in 10 pages.

(56) References Cited

OTHER PUBLICATIONS

Blueprint RF, "Hotels Upgrade the Hotel Business Center with SmartCenter from Blueprint RF", as printed Feb. 12, 2015 in 1 page.
Blueprint RF, "Introducing IRIS Conference Management", Full Page Ad, May 18, 2015 in 1 page.
Blueprint RF, "IRIS: Conference Management by Blueprint RF", Jul. 2, 2015 in 2 pages.
Blueprint RF, "Networks Designed for the Hospitality Mind", Banner Ad as printed Jul. 2, 2015 in 1 page.
Blueprint RF, "Networks Designed for the Hospitality Mind", Half Page Ad as printed Feb. 6, 2015 in 1 page.
Blueprint RF, "Network Services Overview", as printed Jul. 12, 2011 in 6 pages.
Blueprint RF, "Next Generation HSIA Platform: Dominion Controller", Jan. 24, 2011 in 7 pages.
Blueprint RF, "SmartCenter by Blueprint RF", as printed Feb. 11, 2015 in 1 page.
Blueprint RF, "SmartCenter by Blueprint RF", as printed Jul. 2, 2015 in 1 page.
"CAIS Internet and Staybridge Suites by Holiday Inn to Set High Speed Internet Standard in the Extended Stay Market", Business Wire, LexisNexis, Sep. 29, 1999, pp. 3.
"CAIS Internet Reports 3Q Earnings", Business Wire, LexisNexis, Nov. 8, 1999, pp. 5.
"CAIS Internet to Acquire Atcom, Inc.", Business Wire, LexisNexis, Aug. 4, 1999, pp. 3.
"CAIS Internet to Introduce 'CAIS Software Solution'; Will Rename Atcom, Inc. as CAIS Division to Complete Acquisition", Business Wire, LexisNexis, Sep. 10, 1999, pp. 2.
"Celebrate 'Get Connected Day' At Local Wingate Inn Hotel as Chain Promotes High Speed Internet Access Amenity", Business Wire, Lexis Nexis, Oct. 5, 1999, pp. 2.
"CMGI to Acquire 1stUp.com; Free Internet Access Provider, Serving More than 400,000 Registered Users, to Benefit from CMGI Resources, Internet Technologies", Business Wire, Lexis Nexis, Sep. 27, 1999, pp. 3.
"Commercial Trials of High-Speed Internet Access Hospitality Solution Under Way," News Center, available from internet at http://news.microsoft.com/1998/03/04/commercial-trials-of-high-speed-internet-access-hospitality-solution-under-way/, posted Mar. 4, 1998, site visited May 5, 2015, in 7 pages.
"Every Open Wingate Inn Hotel Now Wired for High Speed Internet Access", Business Wire, Lexis Nexis, Aug. 30, 1999, pp. 2.
"Finalists for UCSD Connect's 11th Annual Most Innovative New Products Awards Competition Announced", Business Wire, Lexis Nexis, Oct. 28, 1998, pp. 4.
"High-Speed Internet Access a Hit at Wingate Inns; Meeting Room Access Enabling Groups, Driving Hotel Sales", PR Newswire, Lexis Nexis, Sep. 15, 1999, pp. 3.
"Hotel Vintage Park Collaborates With Microsoft and ATCOM/INFO to Offer a New High-Speed Internet Access Solution", Business Wire, Lexis Nexis, Mar. 4, 1998, pp. 2.
Hunt et al., "Windows NT TCP/IP Network Administration", Sample Chapter 6, O'Reilly, 1st Edition, Oct. 1998, pp. 29.
"InterQuest Launches High-Speed Internet Service for Hotels; InterQuest, ATCOM/INFO and Microsoft Deliver High-Speed Internet Solution", PR Newswire, Lexis Nexis, Jun. 2, 1998, pp. 2.
"IPORT Ready for Worldwide Deployment; Commercial Trials for the High-Speed Internet Access Solution a Success; Global Channel of IPORT Resellers in Place", PR Newswire, Lexis Nexis, Jun. 17, 1998, pp. 4.
"IPORT Version 2.0 Released", Business Wire, Lexis Nexis, Jul. 20, 1998, pp. 3.
Levere, Jane, "High-Speed Access to the Internet is Beginning to be a Feature in Some Hotel Guest Rooms," The New York Times: Business Travel, available from internet at http://www.nytimes.com/1996/10/30/business/high-speed-access-internet-beginning-be-feature-some-hotel-guest-rooms.html, posted Oct. 30, 1996, site visited Jun. 17, 2015, in 2 pages.

"LodgeNet, Ritz-Carlton Extend Arrangement; Customized Co-Branding and In-Room Service to Result From Contract Renewals", PR Newswire, Lexis Nexis, Apr. 23, 1998, pp. 2.
"LodgeNet and Frontier Communications Deploying Internet Services in Hotels; Industry Leaders Validate New Business Model with Combined Service", PR Newswire, Lexis Nexis, Apr. 14, 1999, pp. 2.
LodgeNet and Wingate Inns International, Inc. Sign Historic Hotel Internet Agreement; Deal to Bring Internet Laptop Connectivity to Thousands of Wingate Inn Hotel Rooms Nationwide in 1999, PR Newswire, Lexis Nexis, Jan. 14, 1999, pp. 6.
"LodgeNet Begins 1999 by Achieving Major Milestones—700,00 Total Rooms, 600,000 Guest Pay Rooms, 550,000 Nintendo Rooms", PR Newswire, Lexis Nexis, Jan. 4, 1999, pp. 2.
"LodgeNet Brings 'Power of the Internet' to Ritz-Carlton Hotels; Companies Extend Exclusive Interactive Television Agreement", PR Newswire, Lexis Nexis, Nov. 16, 1999, pp. 2.
"LodgeNet Enabling Wingate Inns International to Welcome 'Wired' Guests Nationwide; Full-Property Internet Access Now Available Across Business-Oriented Chain; Aggressive Deployment to Continue", PR Newswire, Lexis Nexis, Sep. 13, 1999, pp. 2.
"LodgeNet Reports Another Record Quarter; Record Quarterly Revenue of $45.8 Million; EBITDA up 38.5% to a record $14.6 Million; Operation Income Achieved", PR Newswire, Lexis Nexis, Oct. 28, 1998, pp. 7.
"LodgeNet Reports Continued Record Results for 4th Quarter and Full Year 1998;—Annual Revenue up to 22.6% to $166.4 Million—Annual EBITDA up 36.1% to $48.6 Million—Quarterly EBITDA up 46.3% to $13.1 Million", PR Newswire, Lexis Nexis, Feb. 24, 1999, pp. 10.
"LodgeNet Reports First Quarter Results Exceeding Destination 2000 Goals", PR Newswire, Lexis Nexis, Apr. 27, 1999, pp. 7.
"LodgeNet Sells Interest in 1stUp.com; $%Stock-for-Stock Deal with CMGI; Sale Accelerates LodgeNet's Drive Toward Free Cash Flow", PR Newswire, Lexis Nexis, Nov. 8, 1999, pp. 2.
"LodgeNet Signs New Business with FelCor; New Contracts Expand Portfolio with Hotel Leader to Nearly 17,000 Rooms", PR Newswire, Lexis Nexis, Oct. 19, 1998, pp. 2.
"LodgeNet Surpasses 750,000 Total Guest Rooms; Milestone Represents Success in Virtually Every Lodging Segment", PR Newswire, Lexis Nexis, Oct. 12, 1999, pp. 2.
"LodgeNet to Bring Internet Laptop Connectivity to 120 Wingate Inn® Hotels", Hotel Online Special Report, Sioux Falls, SD, Jan. 14, 1999, pp. 3. <http://www.hotel-online.com/News/PressReleases1999_1st/Jan99_LodgenetWingate.html>.
"Lucent Technologies Launches Breakthrough DSL Platform High-Quality Voice, Data and Video Services", Business Wire, LexisNexis, Sep. 7, 1999, pp. 3.
Messmer, Ellen, "New Room-Service Fare: High-Speed Internet Access", Carriers & ISPs, Dec. 7, 1998, p. 38.
Micros® Systems, Inc. "PMS Interface Specifications Manual", 1700/2000/3700/4700/8700 System Software, Part Number: 150502-029 (9th Ed.), Copyright 1986-1998, pp. 54.
"New Atcom/Info Technology Will Accelerate Mass-Market Adoption of Broadband Internet Access", Business Wire, Lexis Nexis, May 11, 1999, pp. 2.
"News From CAIS Internet & CGX Communications; Commercial Trials of High-Speed Internet Access Hospitality Solution Under Way; ATCOM/INFO and Microsoft Plan Large-Scale Deployment of IPORT for Mid-1998," PR Newswire, Lexis Nexis, Mar. 4, 1998, pp. 4.
"On Command Corporation Announces First Quarter Financial Results", PR Newswire, Lexis Nexis, Apr. 28, 1999, pp. 5.
"On Command Corporation and Marriott International Announce Market Trial of In-Room High-Speed Connectivity Solutions", PR Newswire, Lexis Nexis, Nov. 2, 1998, pp. 6.
"On Command Corporation and Promus Hotel Corporation Announce High-Speed Internet Access Market Trial; Doubletree Hotel Orange County Airport Chosen to Test on Command's Guest Room and Meeting Space Connectivity Services", PR Newswire, Lexis Nexis, Feb. 11, 1999, pp. 2.
"On Command Corporation and Wyndham International, Inc. Agree to Begin @Hotel(Sm) PC High-Speed Internet Access Market Trial;

(56) References Cited

OTHER PUBLICATIONS

New, 417-Room Wyndham Chicago in City's 'Magnificent Mile' Corridor Selected to Test on Command's Guestroom and Meeting Space Connectivity Services", PR Newswire, Lexis Nexis, Apr. 15, 1999, pp. 3.
"On Command Corporation Wins New Contract for Six Sheraton Hotel Installations; Seven-Year Exclusive Agreement with Kyo-ya Company Adds Hotel Properties in Key Markets", PR Newswire, Lexis Nexis, May 20, 1998, pp. 2.
"On Command Selects Com21 for Multi-City Internet Trial with Marriott International; Com21 to Provide Cable Modems for In-room, High-Speed Laptop Internet Access", Business Wire, Lexis Nexis, Dec. 2, 1998, pp. 4.
Opera Hotel Edition GTS, Opera Version 5x and above, [Redacted], Aug. 1, 2009 in 2 pages.
"Patriot American and on Command Announce New In-Room Entertainment Services Agreement; Exclusive Multi-year Pact Extends Existing Master Contract, Provides for Installation in 185 Hotels with Dynamic, New OCX™ Technology", PR Newswire, Lexis Nexis, Mar. 17, 1999, pp. 3.
"Qwest and CAIS Internet Sign $100 Million Broadband Agreement; CAIS to Roll-Out High-Speed OverVoice Internet Service to Hotels and Apartments Nationwide", PR Newswire, Lexis Nexis, Jun. 15, 1998, pp. 3.
"Royal Caribbean International Introduces Onboard Guest Internet Communications Centers," Royal Caribbean Cruises Ltd., available from internet at http://www.rclinvestor.com/phoenix.zhtml?c=103045 &p=irol-newsArticle&ID=48416, posted Aug. 24, 1999, site visited Jun. 17, 2015, in 2 pages.
RPOWER, "Micros 4700 PMS Interface", <http://rpowerpos.com/wiki/index.php?title=Micros_4700_PMS_Interface&printable=yes> as printed Nov. 11, 2015 in 4 pages.
"Strategic Partnership Enables Meeting and Conference Planners Find Hotels Equipped with High-Speed Internet Access", Business Wire, Lexis Nexis, Jul. 4, 1999, pp. 3.
"Syzygy Network Solutions Completes Recabling of Four Seasons Hotel—Los Angeles at Beverly Hills During Multi-Million Dollar Renovation", Business Wire, Lexis Nexis, Jan. 4, 1999, pp. 3.
"Tarragon Realty Investors to Install CAIS Internet Total High Speed Internet Access Solution in 16,000 Tarragon Apartment Units", Business Wire, Lexis Nexis, Aug. 24, 1999, pp. 3.
"Tuts Expresso MDU Selected By On Command to Complete Marriott International High-Speed Internet Access Market Trial Installations", Business Wire, Lexis Nexis, Jan. 27, 1999, pp. 2.
"UCSD Connect Seeks Cutting Edge San Diego Companies for its 12th Annual Most Innovative New Products Competition", Business Wire, Lexis Nexis, Sep. 7, 1999, pp. 2.
"U S West and Ark Interface Introduce Free Sites on Public Internet Terminals", Business Wire, Lexis Nexis, Mar. 25, 1998, pp. 3.
"Xedia's Access Point Products Selected by ATCOM/INFO to Provide Quality of Service for New High-Speed Internet Access System", Business Wire, Lexis Nexis, Jul. 21, 1999, pp. 3.
Blueprint RF Proposed Claim Construction Terms with respect to U.S. Pat. Nos. 6,686,399; 8,788,690; 6,636,894; 8,156,246; 8,266,266; 8,266,269; 8,364,806 dated Mar. 24, 2016 in 2 pages.
Blueprint RF Proposed Claim Constructions for the asserted claims dated Jan. 29, 2016 in 3 pages.
Blueprint RF Proposed Claim Constructions for the PMS patents dated Jan. 26, 2016 in 1 page.
Case No. 2:14-cv-08256 DDP (VBKx), *Hospitality Core Services LLC, d/b/a Blueprint RF v. Nomadix, Inc.*, Declaration of Keith Olson, U.S. Pat. No. 6,636,894, dated Oct. 19, 2015 in 54 pages.
Case No. 2:14-cv-08256 DDP (VBKx), *Hospitality Core Services LLC, d/b/a Blueprint RF v. Nomadix, Inc.*, Declaration of Keith Olson, U.S. Pat. No. 8,156,246, dated Oct. 22, 2015 in 42 pages.
Case No. 2:14-cv-08256 DDP (VBKx), *Hospitality Core Services LLC, d/b/a Blueprint RF v. Nomadix, Inc.*, Declaration of Keith Olson, U.S. Pat. No. 8,266,266, dated Oct. 22, 2015 in 42 pages.
Case No. 2:14-cv-08256 DDP (VBKx), *Hospitality Core Services LLC, d/b/a Blueprint RF v. Nomadix, Inc.*, Declaration of Keith Olson, U.S. Pat. No. 8,266,269, dated Oct. 22, 2015 in 42 pages.
Case No. 2:14-cv-08256 DDP (VBKx), *Hospitality Core Services LLC, d/b/a Blueprint RF v. Nomadix, Inc.*, Declaration of Keith Olson, U.S. Pat. No. 8,364,806, dated Oct. 22, 2015 in 42 pages.
Case No. 2:14-cv-08256 DDP (VBKx), *Hospitality Core Services LLC, d/b/a Blueprint RF v. Nomadix, Inc.*, Petition for Inter Partes Review of U.S. Pat. No. 6,636,894 Under 35 U.S.C. §§ 311-319 and 37 C.F.R. §§ 42.1-.80, 42.100-.123, dated Oct. 21, 2015 in 69 pages.
Case No. 2:14-cv-08256 DDP (VBKx), *Hospitality Core Services LLC, d/b/a Blueprint RF v. Nomadix, Inc.*, Petition for Inter Partes Review of U.S. Pat. No. 8,156,246 Under 35 U.S.C. §§ 311-319 and 37 C.F.R. §§ 42.1-.80, 42.100-.123, dated Oct. 23, 2015 in 68 pages.
Case No. 2:14-cv-08256 DDP (VBKx), *Hospitality Core Services LLC, d/b/a Blueprint RF v. Nomadix, Inc.*, Petition for Inter Partes Review of U.S. Pat. No. 8,266,266 Under 35 U.S.C. §§ 311-319 and 37 C.F.R. §§ 42.1-.80, 42.100-.123, dated Oct. 27, 2015 in 62 pages.
Case No. 2:14-cv-08256 DDP (VBKx), *Hospitality Core Services LLC, d/b/a Blueprint RF v. Nomadix, Inc.*, Petition for Inter Partes Review of U.S. Pat. No. 8,266,269 Under 35 U.S.C. §§ 311-319 and 37 C.F.R. §§ 42.1-.80, 42.100-.123, dated Oct. 27, 2015 in 69 pages.
Case No. 2:14-cv-08256 DDP (VBKx), *Hospitality Core Services LLC, d/b/a Blueprint RF v. Nomadix, Inc.*, Petition for Inter Partes Review of U.S. Pat. No. 8,364,806 Under 35 U.S.C. §§ 311-319 and 37 C.F.R. §§ 42.1-.80, 42.100-.123, dated Oct. 27, 2015 in 69 pages.
Case No. 2:14-cv-08256 DDP (VBKx), *Nomadix, Inc. v. Hospitality Core Services LLC, d/b/a Blueprint RF*, [098] Supplement to Memorandum in Support of Motion for Partial Summary Judgment of Patent Invalidity Under 35 U.S.C. §§ 102 and 103, dated Sep. 9, 2015 in 21 pages.
Case No. 2:14-cv-08256 DDP (VBKx), *Nomadix, Inc. v. Hospitality Core Services LLC, d/b/a Blueprint RF*, [101] Notice of Manual Filing or Lodging, dated Oct. 5, 2015 in 3 pages.
Case No. 2:14-cv-08256 DDP (VBKx), *Nomadix, Inc. v. Hospitality Core Services LLC, d/b/a Blueprint RF*, [102] Nomadix's Opposition to Defendants Cross-Motion for Partial Summary Judgement of Noninfringement, dated Oct. 5, 2015 in 26 pages.
Case No. 2:14-cv-08256 DDP (VBKx), *Nomadix, Inc. v. Hospitality Core Services LLC, d/b/a Blueprint RF*, [103] Nomadix's Statement of Genuine Disputes of Material Fact in Opposition to Hospitality Core Services LLC's Cross Motion for Partial Summary Judgment of Non-Infringement, dated Oct. 5, 2015 in 7 pages.
Case No. 2:14-cv-08256 DDP (VBKx), *Nomadix, Inc. v. Hospitality Core Services LLC, d/b/a Blueprint RF*, [104] Declaration of Mark Lezama in Support of Nomadix's Oppositions to Defendants Summary-Judgment Motions, (Dkt. Nos. 81, 85, 88) dated Oct. 5, 2015 in 82 pages.
Case No. 2:14-cv-08256 DDP (VBKx), *Nomadix, Inc. v. Hospitality Core Services LLC, d/b/a Blueprint RF*, [105] Declaration of Mark Jackson in Support of Nomadix's Oppositions to Docket No. 88 dated Oct. 5, 2015 in 9 pages.
Case No. 2:14-cv-08256 DDP (VBKx), *Nomadix, Inc. v. Hospitality Core Services LLC, d/b/a Blueprint RF*, [106] Declaration of Kelly H. Hughes in Support of Nomadix's Opposition to Docket No. 88, dated Oct. 5, 2015 in 4 pages.
Case No. 2:14-cv-08256 DDP (VBKx), *Nomadix, Inc. v. Hospitality Core Services LLC, d/b/a Blueprint RF*, [107] Nomadix's Statement of Genuine Disputes of Material Fact in Opposition to Defendants Motion for Partial Summary Judgment of Patent Invalidity Under 35 U.S.C. §§ 102 and 103, dated Oct. 5, 2015 in 8 pages.
Case No. 2:14-cv-08256 DDP (VBKx), *Nomadix, Inc. v. Hospitality Core Services LLC, d/b/a Blueprint RF*, [108] Nomadix's Statement of Genuine Disputes of Material Fact in Opposition to Hospitality Core Services LLC's Motion for Partial Summary Judgment of Patent Invalidity Under 35 U.S.C. § 112 and Double Patenting, dated Oct. 5, 2015 in 8 pages.
Case No. 2:14-cv-08256 DDP (VBKx), *Nomadix, Inc. v. Hospitality Core Services LLC, d/b/a Blueprint RF*, [109] Nomadix's Opposition to Defendants Motion for Partial Summary Judgment of Invalidity Under §§ 102 and 103, dated Oct. 5, 2015 in 40 pages.
Case No. 2:14-cv-08256 DDP (VBKx), *Nomadix, Inc. v. Hospitality Core Services LLC, d/b/a Blueprint RF*, [110] Nomadix's Opposi-

(56) References Cited

OTHER PUBLICATIONS tion to Defendants Motion for Partial Summary Judgment of Invalidity Under 35 U.S.C. § 112 and Double Patenting, dated Oct. 5, 2015 in 38 pages.
Case No. 2:14-cv-08256 DDP (VBKx), *Nomadix, Inc.* v. *Hospitality Core Services LLC, d/b/a Blueprint RF*, [111] Nomadix's Application to file Under Seal Declarations and Exhibits in Support of Oppositions to Defendants Summary Judgement Motions, dated Oct. 6, 2015 in 3 pages.
Case No. 2:14-cv-08256 DDP (VBKx), *Nomadix, Inc.* v. *Hospitality Core Services LLC, d/b/a Blueprint RF*, [112] Order Granting Application to File Under Seal, dated Oct. 7, 2015 in 2 pages.
Case No. 2:14-cv-08256 DDP (VBKx), *Nomadix, Inc.* v. *Hospitality Core Services LLC, d/b/a Blueprint RF*, [117] Reply in Motion for Partial Sumary Judgment of Invalidity Under §§ 102 and 103, dated Oct. 13, 2015 in 315 pages. [Submitted in 2 parts].
Case No. 2:14-cv-08256 DDP (VBKx), *Nomadix, Inc.* v. *Hospitality Core Services LLC, d/b/a Blueprint RF*, [118] Blueprint Rf's Reply Brief in Support of its Cross Motion for Partial Summary of Non-Infringement of the '246 Patent, dated Oct. 13, 2015 in 166 pages.
Case No. 2:14-cv-08256 DDP (VBKx), *Nomadix, Inc.* v. *Hospitality Core Services LLC, d/b/a Blueprint RF*, [119] Blueprint Rf's Reply on its Motion for Partial Summary Judgment of Patent Invalidity Under 35 U.S.C. Section 112 and for Double Patenting, dated Oct. 13, 2015 in 154 pages.
Case No. 2:14-cv-08256 DDP (VBKx), *Nomadix, Inc.* v. *Hospitality Core Services LLC, d/b/a Blueprint RF*, Declaration of Deborah K. Miller for Oracle Corporation dated Feb. 12, 2016 in 3 pages.
Case No. 2:14-cv-08256 DDP (VBKx), *Nomadix, Inc.* v. *Hospitality Core Services LLC, d/b/a Blueprint RF*, Draft Second Declaration of Keith Olson in 18 pages.
Case No. 2:14-cv-08256 DDP (VBKx), *Nomadix, Inc.* v. *Hospitality Core Services LLC, d/b/a Blueprint RF*, Nomadix's Responses to Blueprint RF's Fourth Set of Requests for Admission (108-221) dated Apr. 25, 2016 in 6 pages.
Case No. 2:14-cv-08256 DDP (VBKx), *Nomadix, Inc.* v. *Hospitality Core Services LLC, d/b/a Blueprint RF.*, [129] Supplement to Replies in Motions for Partial Summary Judgment DKT No. 117, 118 and 119, dated Nov. 5, 2015 in 45 pages.
Case No. 2:14-cv-08256 DDP (VBKx), *Nomadix, Inc.* v. *Hospitality Core Services LLC, d/b/a Blueprint RF.*, [130] Second Supplement to Replies in Motions for Partial Summary Judgment DKT No. 117, 118 and 119, dated Nov. 10, 2015 in 25 pages.
Case No. 2:14-cv-08256 DDP (VBKx), *Nomadix, Inc.* v. *Hospitality Core Services LLC, d/b/a Blueprint RF.*, [131] Second Supplement to Replies in Motions for Partial Summary Judgment DKT No. 117, 118 and 119, dated Nov. 17, 2015 in 57 pages.
Case No. 2:14-cv-08256 DDP (VBKx), *Nomadix, Inc.* v. *Hospitality Core Services LLC, d/b/a Blueprint RF.*, [133] Nomadix's Objections to Defendants Summary-Judgment Reply Briefs and Supplementation, dated Nov. 18, 2015 in 6 pages.
Case No. 2:14-cv-08256 DDP (VBKx), *Nomadix, Inc.* v. *Hospitality Core Services LLC, d/b/a Blueprint RF.*, [134] Response to Objections to Summary-Judgment Reply Briefs and Supplementation, dated Nov. 23, 2015 in 13 pages.
Case No. 2:14-cv-08256 DDP (VBKx), *Nomadix, Inc.* v. *Hospitality Core Services LLC, d/b/a Blueprint RF.*, [136] Nomadix's Selection of Asserted Claims, dated Nov. 27, 2015 in 4 pages.
Case No. 2:14-cv-08256 DDP (VBKx), *Nomadix, Inc.* v. *Hospitality Core Services LLC, d/b/a Blueprint RF.*, [141] Minute Order Denying Defendants Request to Leave to File Supplemental Brief (Docket No. 137), dated Dec. 8, 2015 in 1 page.
Case No. 2:14-cv-08256 DDP (VBKx), *Nomadix, Inc.* v. *Hospitality Core Services LLC, d/b/a Blueprint RF.*, [142] Order Re Motions for Summary Judgment [Dkt. Nos. 72, 81, 85, 88], dated Jan. 27, 2016 in 37 pages.
Case No. 2:14-cv-08256 DDP (VBKx), *Nomadix, Inc.* v. *Hospitality Core Services LLC, d/b/a Blueprint RF.*, Defendants Fed. R. Evid. 807 Hearsay Notice, dated Mar. 21, 2016 in 25 pages.
Case No. 2:14-cv-08256 DDP (VBKx), *Nomadix, Inc.* v. *Hospitality Core Services LLC, d/b/a Blueprint RF.*, Defendant's Fourth Supplemental Responses to Plaintiffs First Interrogatories, dated Jan. 13, 2015 in 13 pages.
Case No. 2:14-cv-08256 DDP (VBKx), *Nomadix, Inc.* v. *Hospitality Core Services LLC, d/b/a Blueprint RF.*, Nomadix's First Supplemental Responses to Blueprint RFs Interrogatories 10, 20, and 21, dated Mar. 11, 2016 in 39 pages.
Case No. 2:14-cv-08256 DDP (VBKx), *Nomadix, Inc.* v. *Hospitality Core Services LLC, d/b/a Blueprint RF.*, Nomadix's Responses to Blueprint RFs Second Set of Requests for Production (11-26), dated Mar. 3, 2016 in 17 pages .
Claim Chart, U.S. Pat. No. 6,868,399 with respect to Reference ATCOM/IPORT white paper, and Ex 1007-Short PCT: WO98/40990, Ex 1025 ATCOM Manual, Ex 1018 Micros-Fidelio, dated Jul. 23, 2015, in 22 pages.
Claim Chart, Patent No. U.S. Pat. No. 6,868,399 with respect to Reference U.S. Pat. No. 6,226,677—Slemmer and Reference: Micros-Fidelio, dated Jul. 22, 2015, in 35 pages.
Claim Chart, U.S. Pat. No. 8,788,690 with respect to Reference ATCOM/IPORT white paper, and Ex 1007-Short PCT: WO98/40990, Ex 1025 ATCOM Manual, Ex 1018 Micros-Fidelio, Vu 5,623,601, App. Ser. 12685585 (266 Pat), Cohen 6,389,462, Brendel 6,182,139, RFC 1919, dated Jul. 24, 2015, in 24 pages.
Claim Chart, U.S. Pat. No. 8,788,690 with respect to Reference U.S. Pat. No. 6,226,677—Slemmer, and Reference: Micros-Fidelio, dated Jul. 22, 2015, in 17 pages.
Exhibit List, Petition for Covered Business Model (CBM), Review of U.S. Pat. No. 6,868,399, pp. 3.
Letter from Jett King of LexisNexis, a division of RELX Inc. To Michael J. Mehrman of Sandy Springs, GA, as notarized Mar. 1, 2016 in 8 pages.
Case No. IPR2019-00211, *Guest Tek Interactive Entertainment Ltd.* v. *Nomadix, Inc.*, Petition for Inter Partes Review of U.S. Pat. No. 7,953,857, dated Nov. 12, 2018 in 76 pages.
Case No. IPR2019-00258, *Guest Tek Interactive Entertainment Ltd.* v. *Nomadix, Inc.*, Petition for Inter Partes Review of U.S. Pat. No. 8,626,922, dated Nov. 12, 2018 in 75 pages.
Case No. IPR2019-00211, *Guest Tek Interactive Entertainment Ltd.* v. *Nomadix, Inc.*, Declaration of Dr. Peter Dordal, U.S. Pat. No. 7,953,857, Guest Tek Exhibit No. 1002, in 54 pages.
Rupp, et al., "INDEX: A Platform for Determining how People Value the Quality of their Internet Access", INDEX Project Report #98-010P, IEEE, May 1998, in 7 pages.
Edell, et al., "Providing Internet Access: What We Learn From INDSX", INDEX Project Report #99-010W, University of California, Berkeley, Apr. 16, 1999, in 18 pages.
Case No. IPR2019-00211, *Guest Tek Interactive Entertainment Ltd.* v. *Nomadix, Inc.*, Declaration of Gerard P. Grenier of IEEE, Guest Tek Exhibit No. 1012, in 12 pages.
Case No. IPR2019-00211, *Guest Tek Interactive Entertainment Ltd.* v. *Nomadix, Inc.*, Excerpt from Prosecution History of U.S. Pat. No. 7,953,857, Guest Tek Exhibit No. 1003, in 26 pages.
Blake et al., Request for Comments 2475: An Architecture for Differentiated Services, IETF (Dec. 1998), in 36 pages.
Case No. IPR2019-00211, *Guest Tek Interactive Entertainment Ltd.* v. *Nomadix, Inc.*, Printout from IEEE website regarding INDEX Project Report #98-010P, Guest Tek Exhibit No. 1013, in 1 page.
Case No. IPR2019-00211, *Guest Tek Interactive Entertainment Ltd.* v. *Nomadix, Inc.*, "IETF, Request for Comment 2597: Assured Forwarding PHB Group" (Jun. 1999), Guest Tek Exhibit No. 1014, in 11 pages.
Case No. IPR2019-00211, *Guest Tek Interactive Entertainment Ltd.* v. *Nomadix, Inc.*, Odlyzko, Andrew, "The economics of the Internet: Utility, utilization, pricing, and Quality of Service" (Jul. 7, 1998), Guest Tek Exhibit No. 1015, in 44 pages.
Case No. IPR2019-00211, *Guest Tek Interactive Entertainment Ltd.* v. *Nomadix, Inc.*, "The ATM Forum, Traffic Management Specification Version 4.0, af-tm-0056.000" (Apr. 1996), Guest Tek Exhibit No. 1016, in 108 pages.
Case No. IPR2019-00211, *Guest Tek Interactive Entertainment Ltd.* v. *Nomadix, Inc.*, MacKie-Mason, et al., "Pricing the Internet" (Feb. 10, 1994), Guest Tek Exhibit No. 1017, in 39 pages.

(56) References Cited

OTHER PUBLICATIONS

Case No. IPR2019-00211, *Guest Tek Interactive Entertainment Ltd. v. Nomadix, Inc.*, Sarkar, Mitrabarun "An Assessment of Pricing Mechanisms for the Internet—A Regulatory Imperative" Journal of Electronic Publishing, vol. I, Issue 1&2, Jan.-Feb. 1995, Guest Tek Exhibit No. 10148 in 11 pages.

Case No. IPR2019-00211, *Guest Tek Interactive Entertainment Ltd. v. Nomadix, Inc.*, Odlyzko, Andrew, "The economics of the Internet: Utility, utilization, pricing, and Quality of Service" (Jul. 7, 1998), Guest Tek Exhibit No. 1019, in 44 pages.

Case No. IPR2019-00211, *Guest Tek Interactive Entertainment Ltd. v. Nomadix, Inc.*, "Pages from Electronics Dictionary" McGraw-Hill, 6th edition (1997), Guest Tek Exhibit No. 1020, in 4 pages.

Case No. IPR2019-00211, *Guest Tek Interactive Entertainment Ltd. v. Nomadix, Inc.*, Wallmeier, et al., "The Spacing Policer, an algorithm for efficient peak bit rate control in ATM networks" Proc. International Switching Symposium (Oct. 14, 1992), Guest Tek Exhibit No. 1021, in 6 pages.

* cited by examiner

SYSTEMS AND METHODS FOR DYNAMIC DATA TRANSFER MANAGEMENT ON A PER SUBSCRIBER BASIS IN A COMMUNICATIONS NETWORK

CROSS-REFERENCE TO RELATED APPLICATIONS

The present application is a continuation of U.S. patent application Ser. No. 14/146,971, filed Jan. 3, 2014, which is a continuation of U.S. patent application Ser. No. 13/094,769, filed Apr. 26, 2011, now U.S. Pat. No. 8,626,922, which is a continuation of U.S. patent application Ser. No. 12/771,915, filed Apr. 30, 2010, now U.S. Pat. No. 7,953,857, which is a continuation of U.S. patent application Ser. No. 09/693,481, filed Oct. 20, 2000, now U.S. Pat. No. 7,739,383, which claims priority from U.S. Provisional Patent Application No. 60/161,182, filed Oct. 22, 1999, the contents of all of which are incorporated by reference in their entirety.

BACKGROUND

Field of the Invention

The present invention relates generally to bandwidth management in a communications network and, more particularly, to a method and apparatus for providing dynamic bandwidth management on a per subscriber basis in a communications network

Description of the Related Art

In order for a host to function properly in a network environment, the host must be appropriately configured. Among other things, this configuration process establishes the protocol and other parameters by which the host transmits and receives data. In one common example, a plurality of hosts are networked to create a local area network (LAN). In the LAN, each host must be appropriately configured in order to exchange data over the network. Since most networks are customized to meet a unique set of requirements, hosts that are part of different networks are generally configured in different manners in order to appropriately communicate with their respective networks.

While desktop computers generally remain a part of the same network for a substantial period of time, laptops or other portable computers are specifically designed to be transportable. As such, portable computers are connected to different networks at different times depending upon the location of the computer. In a common example in which the portable computer serves as an employee's desktop computer, the portable computer is configured to communicate with their employer's network, i.e., the enterprise network. When the employee travels, however, the portable computer may be connected to different networks that communicate in different manners. In this regard, the employee may connect the portable computer to the network maintained by an airport or by a hotel in order to access the enterprise network, the internet or some other on-line service. Since these other networks are configured somewhat differently, however, the portable computer must also be reconfigured in order to properly communicate with these other networks. Typically, this configuration is performed by the user each time that the portable computer is connected to a different network. As will be apparent, this repeated reconfiguration of the portable computer is not only quite time consuming, but is also prone to errors.

A universal subscriber gateway device has been developed by Nomadix, Incorporated of Santa Monica, Calif. This universal subscriber gateway is described by U.S. patent application Ser. No. 08/816,174, entitled "Nomadic Router", filed in the name of inventor Short et. al., on Mar. 12, 1997 and Ser. No. 09/458,602, entitled "Systems and Methods for Authorizing, Authenticating and Accounting Users Having Transparent Computer Access to a Network Using a Gateway Device", filed in the name of inventor Short et. al., on Dec. 8, 1999. These applications have been assigned to Nomadix, the same assignee of the present invention. The contents of both of these applications are herein incorporated by reference as if fully setforth here within. The gateway device serves as an interface connecting the user/subscriber to a number of networks or other online services. For example, the gateway device can serve as a gateway to the Internet, the enterprise network, or other networks and/or on-line services. In addition to serving as a gateway, the gateway device automatically adapts to the protocols and other parameters of the host, in order that it may communicate with the new network in a manner that is transparent both to the user/subscriber and the new network. Once the gateway device has appropriately adapted data packets transmitted from a host, the host can appropriately communicate via the new network, such as the network at a hotel or at an airport, in order to access other networks, such as the enterprise network, or other online services, such as the internet.

The user/subscriber, and more specifically the remote or laptop user, benefits from being able to access a myriad of communication networks without having to undergo the time-consuming and all-too-often daunting task of reconfiguring their host in accordance with network specific configurations. In this fashion, the gateway device is capable of providing more efficient network access to the user/subscriber. A gateway device is also instrumental in providing the user/subscriber broadband network access that can be tailored to the user/subscriber's needs. In many instances the remote user/subscriber is concerned with being able to acquire network access and levels of service in the most cost-effective manner. Correspondingly, the gateway device administrator desires the capability to be able to offer the user/subscriber numerous different services and billing rate options. By way of example, the remote user/subscriber in a hotel environment may desire a network subscription for the duration of their hotel stay while the user/subscriber in an airport may desire a network subscription for the duration of their layover or until their scheduled flight departs. Additionally, a user/subscriber may desire a certain level of service based on bandwidth concerns and the need for higher or lower data rate transfers. For example, the user/subscriber who is accessing a network for the purpose of viewing text may desire a lower bandwidth service level that meets their particular needs, however, another user/subscriber who is accessing a network for the purpose of downloading files or media-rich content may desire a higher bandwidth service level capable of transferring data at relatively higher speeds.

In today's fast paced computing and networking environment it is even more advantageous to provide these service and billing options dynamically, allowing the user/subscriber to change, for example, billing rates or bandwidth capacity while a network session is on going. This would allow the user/subscriber to be billed at one rate while downloading the data-intensive file or media-rich content while choosing a more cost-effective billing structure for the less data-intensive activities, such as electronic mail (e-mail). As yet another example, the user/subscriber may be sending and/or receiving data-intensive content which requires a certain minimum transfer rate in order to be effectively communicated at the receiving end, such as voiceover IP or video. In such cases, the user/subscriber may desire some guarantee of delivery of the dataintensive content at a relatively higher cost.

Additionally, the dynamic nature of this process would allow the user/subscriber to change service levels or billing rates without the need to exit the network and initiate a new log-on procedure. In effect, the user/subscriber benefits from having a more efficient and less time-consuming means of altering service levels and billing structure.

However, in current network implementations, bandwidth management is typically performed statically, at the time a new subscriber account is established. The new subscriber typically selects a service level and billing structure defining a particular transmission rate (i.e., bandwidth) when establishing the account, and is not afforded the option of changing their service level or billing structure dynamically. In a common example, the service provider configures the network to provide the new subscriber with the subscriber selected bandwidth service level, which typically involves the service provider configuring hardware devices under the control of the service provider, such as a modem or access controller. The user/subscriber is not allowed to dynamically change the bandwidth, but must contact the service provider and request a change in their configuration to allow a higher or lower transmission rate. In response to such a request, the service provider typically assigns a technician to manually implement the reconfiguration of the hardware device(s) and/or other devices or records. In some instances, the subscriber also may be required to reconfigure their host to accommodate the changes in the bandwidth service level.

Therefore, an unsatisfied need exists in the industry for dynamic management of network access bandwidth, particularly when purchasing network access for a relatively short time, such as in an airport or hotel, or with varying network access speed requirements while at home or in the office.

SUMMARY OF THE INVENTION

The present invention comprises a method and device for dynamic bandwidth management on a per subscriber basis. The user/subscriber can independently set and adjust independently the uplink and downlink bandwidths of their network access service. Thus, the user/subscriber can efficiently manage their network access according to the specific activity on the network.

For example, a user/subscriber can select a relatively high maximum bandwidth for the downlink connection when accessing data-intensive content over the network, or a relatively low bandwidth for the downlink connection when accessing less data-intensive content over the network. The change in bandwidth service level is automatically made substantially instantaneously, and the user/subscriber begins receiving service at the new bandwidth and, in most instances, at a corresponding new billing rate. Likewise, the user/subscriber can increase or decrease the bandwidth of the uplink connection so the user/subscriber only purchases the amount of bandwidth appropriate for their network activity.

In addition, the bandwidth manager provides active management of the delivery of data (also known as and referred to herein as traffic shaping) to increase throughput from the gateway device onto the network. This balances the load on the subsequent link; thereby preventing dropped packets or longer delays.

In one embodiment of the invention, a method is defined for dynamic control of data transfer (i.e. bandwidth) by a subscriber in a communications network. The method comprises receiving a data packet at a network device, typically a gateway device and retrieving a subscriber selected bandwidth for the subscriber associated with the data packet. A determination is then made as to whether the transfer rate for data packet transmission should be limited based on the subscriber selected bandwidth. If it is determined that limitation is warranted then the transfer rate for data packet transmission is limited.

In another embodiment of the present invention, a method is defined for dynamic control of data transfer (i.e. bandwidth) by a subscriber in a communications network. The method includes receiving a data packet and retrieving a subscriber priority scheme associated with the data packet. A priority determination is then made for transmitting the packet and the packet is queued for delayed transmission.

In a further embodiment of the present invention, a device for subscriber bandwidth management is defined as including a bandwidth management module that determines if a received data packet will be delayed from further transmission in order to limit the bandwidth of the subscriber to which the data packet is associated and a queue for queuing the data packet for a delay period if the bandwidth management module determines that a delay period is necessary.

DETAILED DESCRIPTION OF THE PREFERRED EMBODIMENT

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
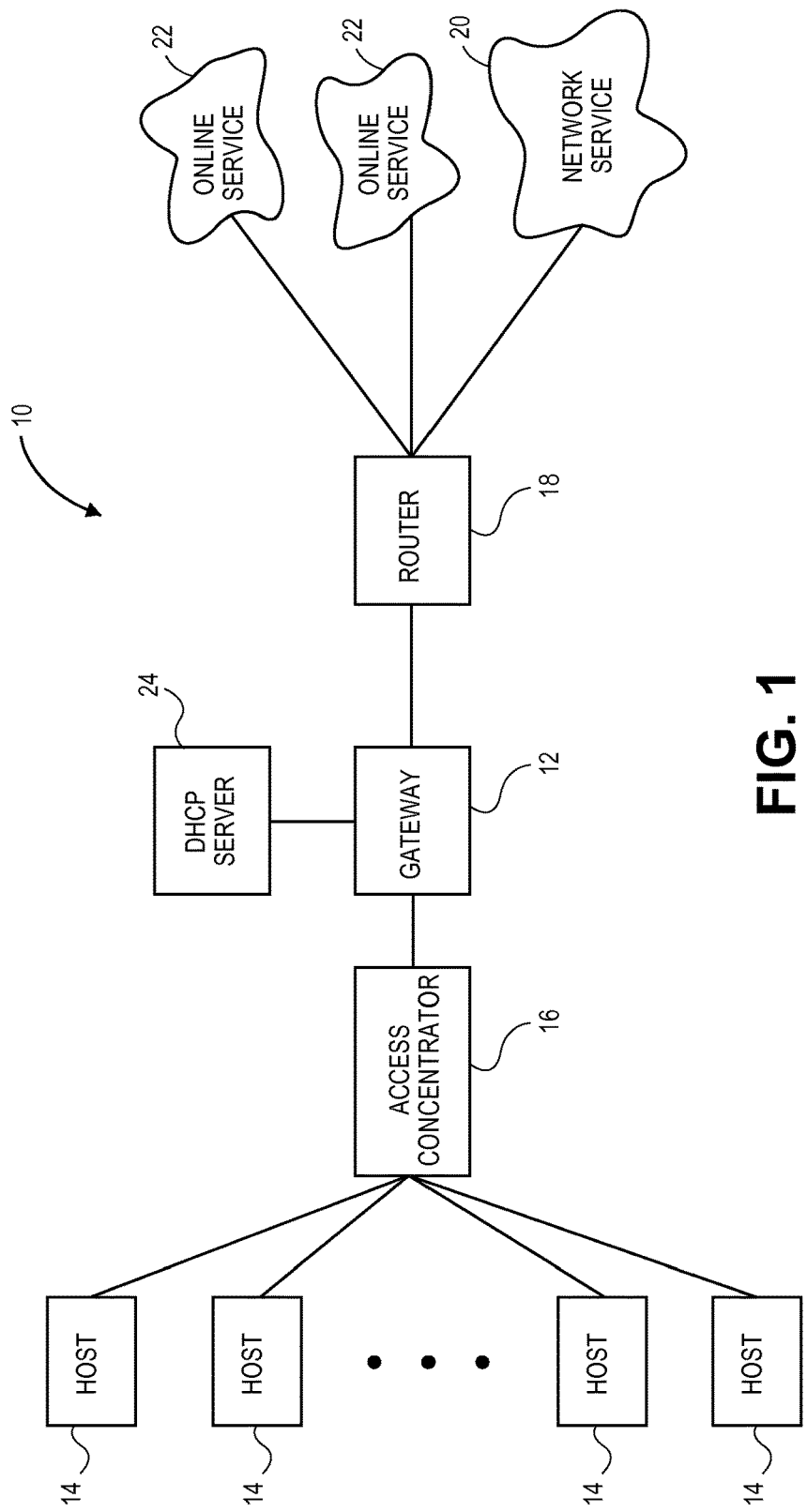
FIG. 1 is a block diagram of a communications network incorporating a gateway device in accordance with an embodiment of the present invention.

Referring now to FIG. 1, a communications network 10 that includes a gateway device 12 is depicted in block diagram form. The network system typically includes a plurality of computers/hosts 14 that access the system in order to gain access to network services or other online services. For example, the hosts can be in communication with ports that are located in different rooms of a hotel or a multi-dwelling residence. Alternatively, the hosts can be in communication with ports in an airport, an arena, or the like. The communication network also includes a gateway device that provides an interface between the plurality of hosts and the various networks or other online services. Most commonly, the gateway device is physically located proximate the hosts at a relatively low position in the structure of the overall network system. (i.e. the gateway device will be located within the hotel, multi-unit residence, airport, etc.) However, the gateway device can be located at a higher position in the overall network system such as at a Point of Presence (PoP) or a Network Operating Center (NOC), if so desired.

Although the gateway device can be physically embodied in many different fashions, the gateway device typically includes a controller and a memory device in which commands are stored that define the operational characteristics of the gateway device. Alternatively, the gateway device can be embedded within another network device, such as an access concentrator or a router, or the commands that define the functioning of the gateway device can be stored on a PCMCIA card that can be executed by one or more hosts in order to automatically reconfigure the host(s) to communicate with a different network.

The network system 10 also typically includes an access concentrator 16 positioned between the hosts 14 and the gateway device 12 for multiplexing the signals received from the plurality of communications onto a link to the gateway device. Depending upon the medium by which the hosts are connected to the access concentrator, the access concentrator can be configured in different manners. For example, the access concentrator can be a digital subscriber line access module (DSLAM) for signals transmitted via regular telephone lines, a cable modem termination system (CMTS) for signals transmitted via coaxial cables, a wireless access point (WAP) for signals transmitted via a wireless network, a switch or the like. As also shown in FIG. 1, the communication network typically includes one or more routers 18 and/or servers (not shown in FIG. 1) in communication with a plurality of network services 20 or other online services 22. While the communication network is depicted to have a single router, the communication network will typically have a plurality of routers, switches, bridges, or the like that are arranged in some hierarchical fashion in order to appropriately route traffic to and from the various networks or other online services. In this regard, the gateway device typically establishes a link with one or more routers. The routers, in turn, establish links with the servers of other network services or other online service providers, such as Internet service providers, based upon the subscriber's selection.

The gateway device 12 is specifically designed to adapt to the configuration of, each of the hosts 14 that log onto the communication network 10 in a manner that is transparent to the subscriber and the network. In the typical communication network that employs dynamic host configuration protocol (DHCP) service, an IP address is assigned to the host that is logging onto the network through communication with the gateway device. The DHCP service can be provided by an external DHCP server 24 or it can be provided by an internal DHCP service located within the gateway device. Once a subscriber opens their web browser or otherwise attempts to access an on-line service, the gateway device will direct the subscriber to enter some form of an identifier such as their ID and password. In an alternate embodiment of the device, it is anticipated that the gateway device will be able to automatically detect this information upon connection of the host to the network or any attempt to log in. The gateway device then determines if the subscriber is entitled to access the communication system, the level of access and/or the type of services to which the subscriber is entitled according to an Authentication, Authorization and Accounting (AAA) procedure that is described by U.S. patent application Ser. Nos. 08/816,174, 09/458,602 and 09/458,569, previously incorporated by reference. An AAA service, which is a database of subscriber records, may be an AAA server remote to the gateway device or the AAA service may comprise a database incorporated into the physical embodiment housing the gateway device.

Assuming that the subscriber has been authenticated and has authorization, the gateway device typically presents subscribers with a home page or control panel that identifies, among other things, the online services or other communication networks that are accessible via the gateway device. In addition, the home page presented by the gateway device can provide information regarding the current parameters or settings that will govern the access provided to the particular subscriber. As such, the gateway administrator can readily alter the parameters or other settings in order to tailor the service according to their particular application. Typically, changes in the parameters or other settings that will potentially utilize additional resources of the network system will come at a cost, such that the gateway administrator will charge the subscriber a higher rate for their service.

The home page also permits the subscriber to select the network service 20 or other online services 22 that the subscriber wishes to access. For example, the subscriber can access the enterprise network on which the host is typically resident. Alternatively, the subscriber can access the Internet or other on-line services. Once the subscriber elects to access a network or other online service, the gateway device establishes appropriate links via one or more routers 18 to the desired network or online service.

Thereafter, the subscriber can communicate freely with the desired network 20 or other online service 22. In order to support this communication, the gateway device 12 generally performs a packet translation function that is transparent to the user/subscriber and the network. In this regard, for outbound traffic from the host 12 to the network service or other on-line service, the gateway device changes attributes within the packet coming from the user/subscriber, such as the source address, checksum, and application specific parameters, to meet the criteria of the network service to which the user/subscriber has accessed. In addition, the outgoing packet includes an attribute that will direct all incoming packets from the accessed network service to be routed through the gateway device. In contrast, the inbound traffic from the accessed network service or other online service that is routed through the gateway device, undergoes a translation function at the gateway device so that the packets are properly formatted for the user/subscriber's host. In this manner, the packet translation process that takes place at the gateway device is transparent to the host, which appears to send and receive data directly from the accessed communication network. Additional information regarding the translation function is provided by U.S. patent application Ser. No. 08/816,714. By implementing the gateway device as an interface between the user/subscriber and the communication network or other online service, however, the user/subscriber will eliminate the need to reconfigure their host 12 upon accessing subsequent networks.

In accordance with the present invention, the gateway device includes a bandwidth manager that enables the user/subscribers at respective hosts to dynamically set and reset the bandwidth of their network access connection. The bandwidth manager can substantially instantaneously adjust the bandwidth available to the user/subscriber without requiring the reconfiguration or reprogramming of a hardware device(s) such as a network modem or access controller, or the restart of an existing session already in process (i.e. thereby providing session flow control). In addition, the bandwidth manager further enables the user/subscriber to independently set the upstream (uplink to the network) and downstream (downlink from the network) bandwidth. Accordingly, the user/subscriber can establish asymmetric bandwidths for upstream and downstream communications, which may be particularly useful if the user/subscriber's network activity involves a disproportionate amount of data being transferred in one direction (upstream or downstream). Depending on the bandwidth service level chosen by the user/subscriber, the user/subscriber will typically be charged an appropriate service fee. This way, the user/subscriber does not pay for bandwidth that they are not using, and only has to pay for additional bandwidth when requested. In a preferred embodiment, the user/subscriber manages their bandwidth service level via an information and control console as disclosed and described in detail in co-pending U.S. patent application Ser. No. 09/541,877, entitled "Information and Control Console for use with a Network Gateway Interface," filed on Apr. 3, 2000, in the name of inventors Short et. al., and assigned to the assignee of the present invention, the disclosure of which is herein incorporated by reference as if setforth fully herein.

In prior art network configurations bandwidth is typically modified statically by having the network administrator establish a baud rate, setting the rate in a modem and the transmitting all data packets in flow at the established baud rate. Additionally, prior art network configurations allow the link level rate to be set through the maximum burst rate or average bit rate. In this fashion, the link level rate in prior art network configurations is typically set statically or manually by a network administrator. The present invention allows for the baud rate to be set at the maximum level and then queuing (i.e. delaying) data packet transmission to simulate a perceived data rate equivalent to a data rate chosen by the subscriber. The gateway device implements the module that allows the subscriber to dynamically adjust the queuing rate of data packets. In this instance, the gateway device can adjust queuing rates on specific packet types (e.g. base queue rates on MAC addresses) and/or specific types of data traffic (e.g. vary queue rates via video traffic versus text). Subscriber profiles that are accessible to the gateway device are used to determine which data packets are to be queued, the scheduling priority assigned to queued data packets and which packets are to be transmitted without delay.

In accordance with the present invention, the gateway device implements a single queue in each transmission direction (i.e., a single queue for uplink data transmission and a single queue for downlink data transmission). These single queues are responsible for both delaying data packet transmission and prioritizing the transmission of data packets in their respective data delivery direction. In prior art networks data packet queuing is typically implemented in multiple queues; a first queue for classifying the data packets and a second queue for prioritizing the data packets. This type of queuing is processor intensive in that an evaluation of all queues for each packet must be made before a determination of which data packets should be sent based on bandwidth priority. The present invention provides for the use of a ring buffer that is less processor intensive than multiple queue methods. The single queue method of the present invention allows for all data packets in a given slot of the ring buffer to be transmitted simultaneously, thus freeing up the processor until the next tick when the next ring slot of the buffer is processed.

Figure 2:
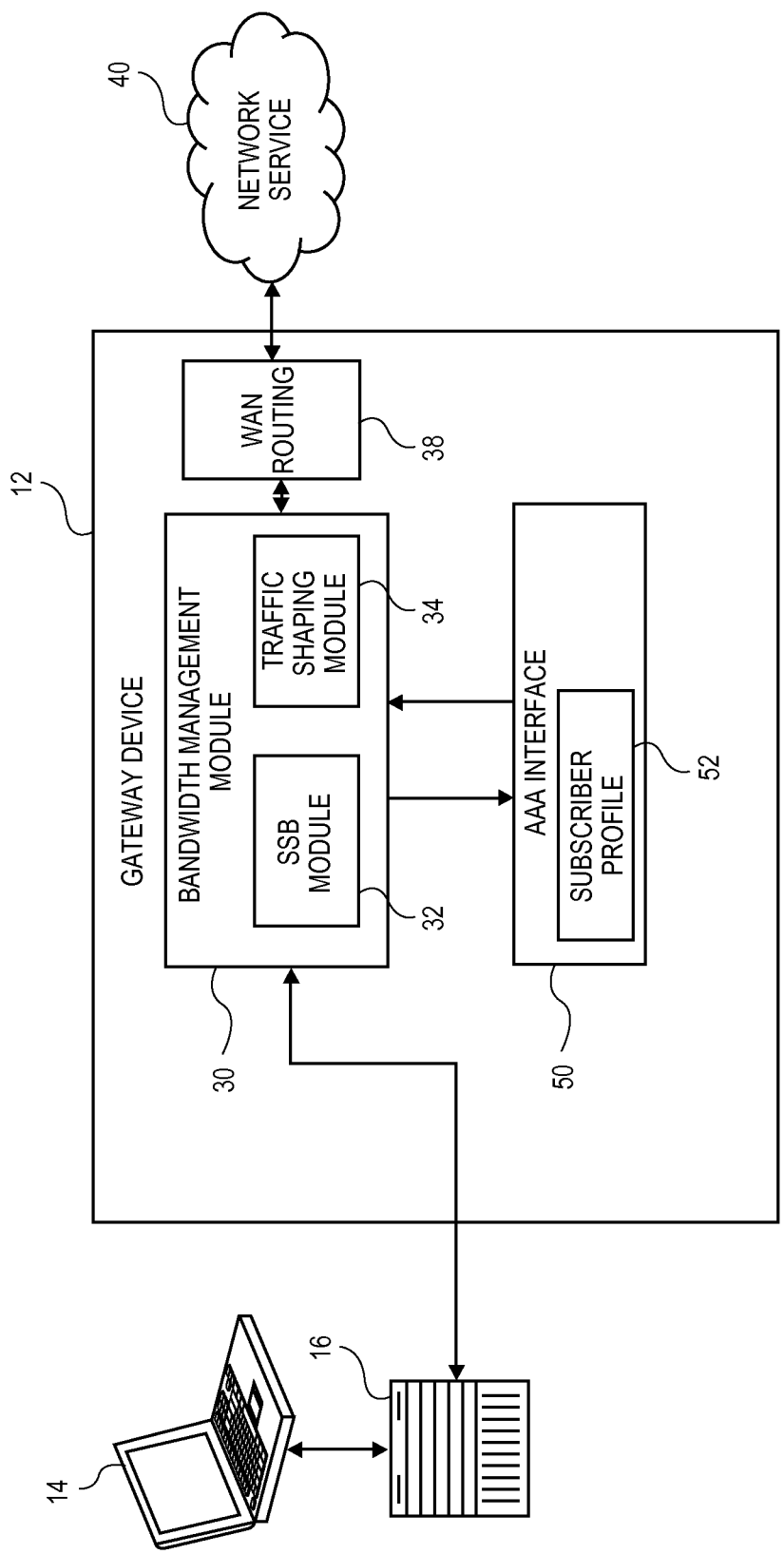
FIG. 2 is a block diagram of a communications network implementing subscriber bandwidth management within a gateway device, in accordance with an embodiment of the present invention.

With reference to FIG. 2, a block diagram of an embodiment of the gateway device 12 in accordance with the present invention is illustrated. Of particular interest with regard to the present invention is the bandwidth management module 30 (also referred to herein as the bandwidth manager). Typically, the bandwidth manager is implemented by the gateway device or the bandwidth manager can be implemented as a component of the protocol stack of the gateway device. The bandwidth manager processes the data packets (or datagram) passing through the gateway device from the user/subscriber host 14 to the network service 40 and from the network service to the user/subscriber. An intermediary device, such as access concentrator 16 is typically positioned in the network between the hosts and the gateway device. The access concentrator serves to multiplex the signals received from the plurality of hosts onto a link to the gateway device. Depending upon the medium by which the hosts are connected to the access controller, the access controller can be configured in different manners. For example, the access controller can be a digital subscriber line access module (DSLAM) for signals transmitted via regular telephone lines, a cable modem termination system (CMTS) for signals transmitted via coaxial cables, a wireless access point (WAP) for signals transmitted via a wireless network, a switch or the like.

The bandwidth manager 30 comprises a subscriber selectable bandwidth module 32 and a traffic shaping module 34, both of which are typically implemented in software. The subscriber selectable bandwidth module 32 limits the upstream and downstream bandwidths on each virtual channel through the gateway device 10 to that which the respective user/subscribers selected. The subscriber selectable bandwidth module 32 identifies the associated user/subscriber by the media access control (MAC) address or other suitable subscriber identifier within the data packet. The subscriber selectable bandwidth module 32 communicates with AAA subscriber management interface 50 to retrieve the subscriber profile 52. The subscriber profile will include the user/subscriber selected bandwidth for uplink: and downlink data transfer. The subscriber selectable bandwidth module 32 then determines whether or not to reschedule the delivery of that packet at a later point in time in order to prevent the user/subscriber from achieving a bandwidth greater than that which the user/subscriber selected.

The subscriber selectable bandwidth module 32 calculates the appropriate delay, if any, using the size (in bytes) of the current data packet, and the size and time of the previous packet delivered from the subscriber. For example, if the user/subscriber has paid for a downlink: bandwidth of 100 kilobits per second (kbps), and the gateway device 12 receives a data packet with the size of 1,500 bytes (12,000 bits), it would schedule a delay between packets of 0.12 seconds (12,000 bits in a packet/100,000 bits per second bandwidth limit).

Figure 3:
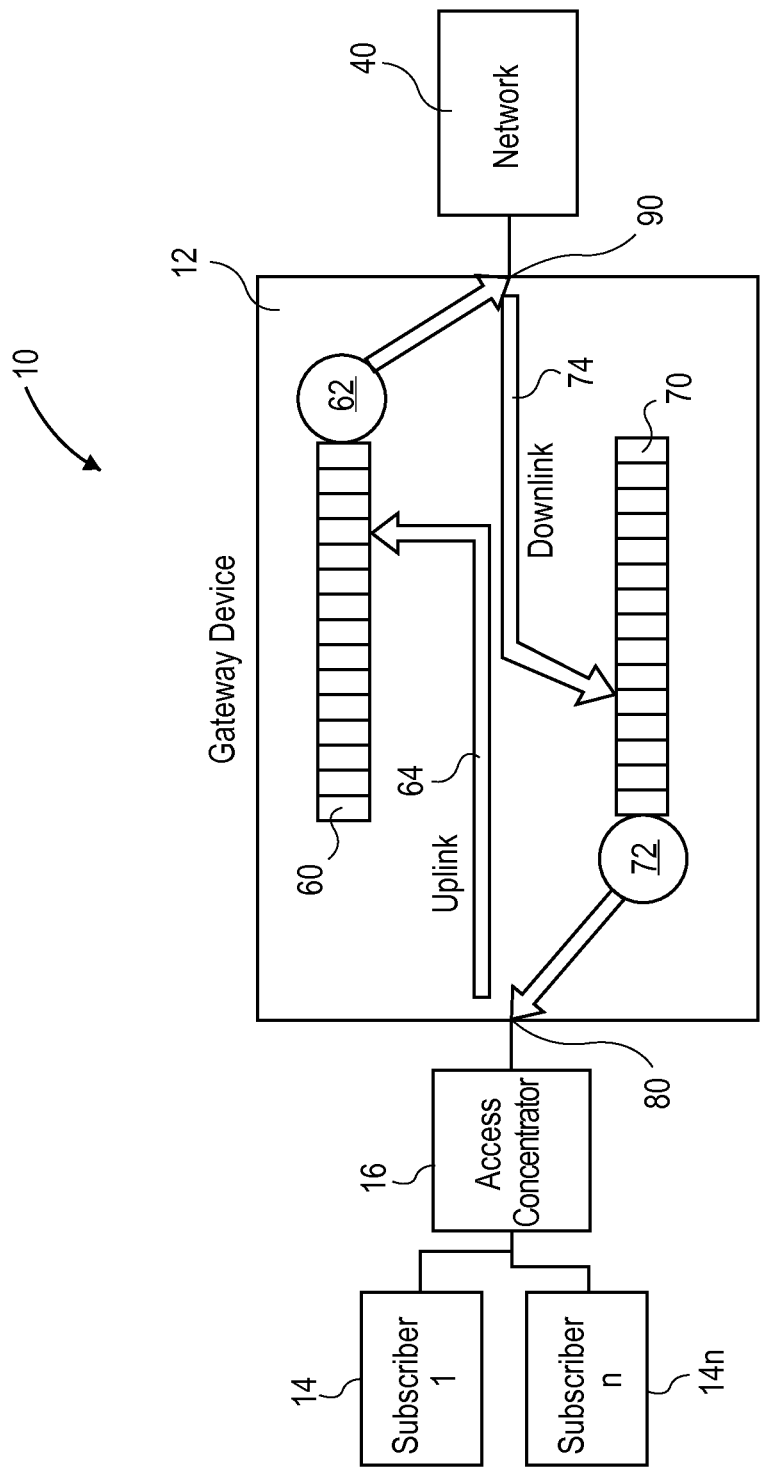
FIG. 3 is a block diagram of a communications network implementing uplink and downlink virtual queues in a gateway device, in accordance with an embodiment of the present invention.

If it is determined that the packet should be delayed, then the subscriber selectable bandwidth module 32 places the packet in memory in a virtual queue for later delivery. FIG. 3 is a block diagram illustrating the use of virtual uplink: and downlink: queues in a gateway device, in accordance with an embodiment of the present invention. The gateway device 12 will implement a virtual uplink: queue 60 and a virtual downlink: queue 70. In operation a plurality of subscriber hosts 14, 14n communicate data packets through the communication network 10. The data packets will typically be initially routed through an access concentrator 16 that serves to multiplex the data packets received from the plurality of hosts. The gateway device receives the data packets coming from the hosts at port 80 and the packets are then communicated to the uplink queue via uplink path 64.

The uplink path is implemented on a per subscriber basis where all traffic from the subscribers is placed into the uplink queue, as required. The subscriber selectable bandwidth module then determines which slot in the queue the data packet is placed in based on how much data from the subscriber is already preoccupying the queue and the degree of utilization of each slot in the queue. If a slot in the queue is full or the subscriber has already placed too much data into a slot, then the data packet will go into a subsequent slot until no more slots are available. At the point at which no more slots are available the queue will drop the packet from further processing. The uplink queue will implement an uplink ring buffer 62 that serves to add delay time to data packets that are placed in the uplink queue. Data packets that leave the ring buffer after the delay period are WAN routed to port 90 for transmission to the network service 40.

The gateway device 12 receives the data packets coming from the network service 40 at port 90 and the packets are then communicated to the downlink queue 70 via downlink path 74. The downlink path is implemented on a per subscriber basis where all traffic from the subscribers is placed into the downlink queue, as required. The subscriber selectable bandwidth module then determines which slot in the queue the data packet is placed in based on how much data from the subscriber is already preoccupying the queue and the degree of utilization of each slot in the queue. If a slot in the queue is full or the subscriber has already placed too much data into a slot, then the data packet will go into a subsequent slot until no more slots are available. At the point at which no more slots are available the queue will drop the packet from further processing. The downlink queue will implement a downlink ring buffer 72 that serves to add delay time to data packets that are placed in the downlink queue. Data packets that leave the ring buffer after the delay period are WAN routed to port 80 for transmission to the plurality of hosts 14, 14n.

In a preferred embodiment of the present invention, the virtual queue is implemented by a ring buffer having 120 time slots (set to equal the number of system ticks), each slot being $\frac{1}{60}^{th}$ of a second. Thus, the ring buffer can delay delivery of a packet up to two seconds. If the delay is to be more than two seconds, then the packet could be dropped or could replace an existing data packet already in the queue. Accordingly, the packet is placed in the appropriate timeslot so that the ultimate delivery of a packet will not produce a bandwidth greater than that selected and paid for by the user/subscriber. When the ring buffer pointer is pointing to the timeslot where the packet resides, the packet is transmitted out to the network or out to the user/subscriber, whichever the case may be. Each timeslot of the ring buffer is a link list of packets having a temporary relationship to the other timeslots according to the granularity of a ring buffer. While the ring buffer may have more than 120 timeslots in order to achieve greater accuracy, increasing the granularity produces increased overhead in a system.

If the user/subscriber wishes to dynamically change either their downlink or uplink bandwidths, such as via an information and control panel displayed on the host, then the new bandwidth(s) is substantially instantaneously recorded in the user/subscriber's profile. When the next packet having the MAC address of the user/subscriber is processed by the subscriber selectable bandwidth module 32, the new bandwidth is retrieved from the profile and utilized by the subscriber selectable bandwidth module 32 to determine if delivery of the packet should be delayed. Thus, the user/subscriber can dynamically change their bandwidth during an access session without requiring a reconfiguration of a component in the network. Typically, when a subscriber makes a change to the bandwidth limits it will correspond to a different billing rate. This allows the user/subscriber to cost effectively manage their network access service. It is noted that the subscriber selectable bandwidth module 32 typically does not guarantee a minimum bandwidth, but operates to limit the maximum bandwidth available to a user/subscriber according to the upstream and downstream bandwidths selected and paid for by the user/subscriber. In fact, the subscriber selectable bandwidth module 32 may operate to make the user/subscriber's network access slower than it actually would be in the absence of bandwidth management as it queues packets associated with the user/subscriber.

The traffic shaping module 34 of the bandwidth manager 30 functions to limit the number of packets transmitted on the link connecting the gateway device 12 to the network 40. In the embodiment illustrated herein, that link is a wide area network (WAN) link 38. In particular, the WAN link 38 is a communications link of finite bandwidth capable of only transmitting a certain number of packets over a given period of time. Accordingly, in order to make most efficient the operation of the WAN link 38, it is desirable to limit the packets being transmitted over the WAN link to that which the WAN link can handle without dropping packets. Accordingly, the traffic shaping module 34 uses a virtual queue in both the uplink and downlink directions that operates essentially the same as the virtual queues of the subscriber selectable bandwidth module 32, with the result of preventing the WAN link 38 from becoming overloading. By queuing the packets for a short period of time before transmitting them when the WAN link reaches its bandwidth capacity, the overall efficiency of the data transfers over the WAN link improves because the packets are not dropped and, therefore, do not need to be retransmitted. The traffic shaping module 34 monitors the traffic over the WAN link 38, and when it appears to be close (slightly above or slightly below) to the bandwidth capacity of the link, then the traffic shaping module 34 begins queuing the packets for short periods of time with the expectation that the packet volume will at some point drop so that the packet will not need to be queued for the time being. Thereby, the likelihood, or at least the number, of packets being dropped is minimized.

Another aspect of traffic management performed by the traffic shaping module 34 is the prioritization of services provided to the users/subscribers. For example, in a preferred embodiment, each user/subscriber pays for a class of service which has associated with it a maximum bandwidth. Currently, those users/subscribers which request a relatively large bandwidth compared to another user/subscriber will have its packets given priority over the packets of the other user/subscriber at the point of being transmitted over the WAN link 38. This is achieved by queuing the packets of the other user/subscribers and not those with priority. This prioritization of the packets of one user/subscriber over that of another user/subscriber can be extended to numerous other implementations. For example, a user/subscriber may purchase a class of service that places a higher prioritization upon a particular type of content, for instance, video data, audio data, etc. In such cases, the traffic shaping module 34 looks into each packet to determine the user/subscriber associated with that packet based upon the MAC address, It is also possible, and within the inventive concepts herein disclosed to have the traffic shaping module 34 look at the packet header and/or IP header to determine the content of the packet and prioritizes accordingly. Specifically, the packets including a protocol utilized to transmit audio content, for example, voiceover IP, may be given priority by the traffic shaping module 34 if the associated user/subscriber paid for such a class of service. Other protocols/parameters on which priority can be based include SMTP, EDP, TCP, a specific IP address, etc. As such the traffic shaping module can be modified to base priority on packet attributes, protocol type and/or destination port addresses.

Yet another example of the prioritization that can be performed by the traffic shaping module 34 in accordance with the present invention is the allocation of bandwidth based on a subscriber's quality of service. This type of allocation would typically guarantee a minimum level of bandwidth for the subscriber. For example, by monitoring the throughput of the gateway device 12, the traffic shaping module 34 can prioritize the packets of a specific user/subscriber who is paying for a specified percentage of the available bandwidth so that the packets of that user are transmitted at the appropriate rate so as to utilize the percentage of available bandwidth. These and other prioritization and scheduling schemes for traffic shaping are often referred to in the industry as weighted fare queuing, deficit round robin, random early detection or the like.

Figure 4A:
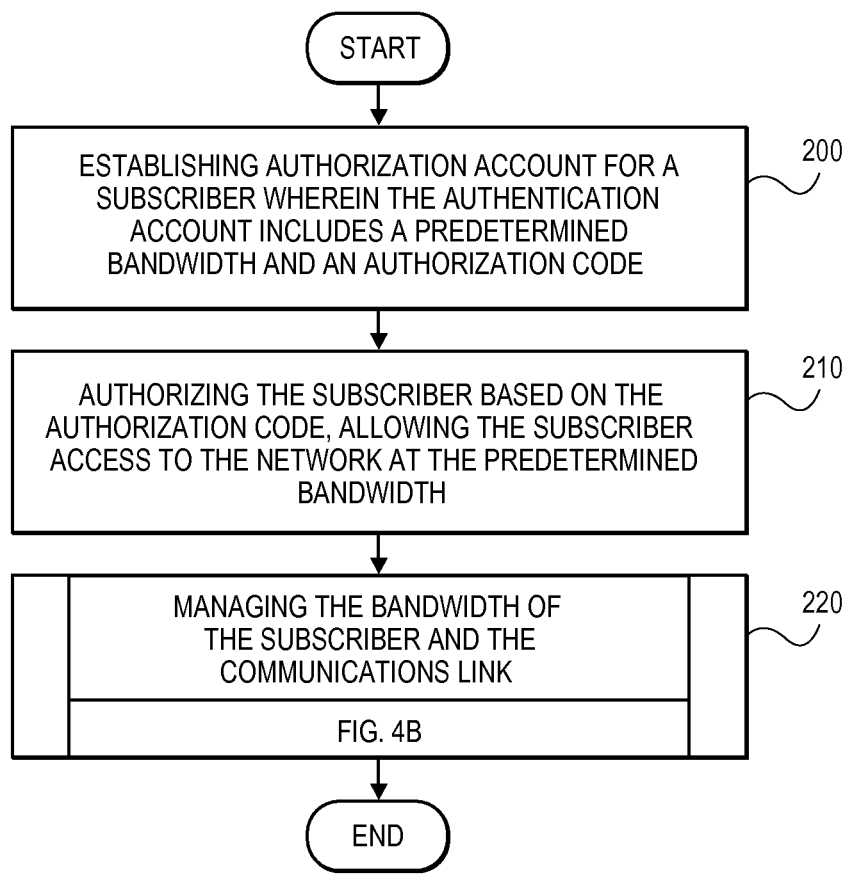
FIGS. 4A and 4B are related flowchart diagrams of a method for subscriber bandwidth management in accordance with an embodiment of the present invention.

With reference to FIG. 4A, a flow diagram of a method in accordance with an embodiment of the present invention for bandwidth management is illustrated. At block 200, a subscriber establishes an authorization account for accessing a communication network through a gateway device in accordance with the present invention. The authorization account typically includes a predetermined bandwidth value, preferably for the uplink and downlink connections, and an authorization code, such as a user name and password. At block 210, the subscriber logs into the gateway device and is authorized based on the subscriber's authorization code. This establishes network access for the subscriber through the gateway device at the predetermined bandwidth found in the authorization account. Next, at block 220, bandwidth management is performed on data packets passing through the gateway device to limit each subscriber's bandwidth to that which they have dynamically selected, and to perform traffic shaping functions, as described in greater detail with the reference to FIG. 4 B. Managing the bandwidth entails receiving a request from the subscriber to dynamically adjust the predetermined bandwidth value to a second bandwidth value and adjusting the limit on the information transfer rate to the second bandwidth value. The adjustment may be for the uplink bandwidth, the downlink bandwidth or both the uplink and downlink bandwidths.

For purposes of clarity, it is noted that that the predetermined bandwidth requested by a subscriber, when establishing a network access service, typically a maximum bandwidth, represents merely a predetermined transfer rate, typically a maximum transfer rate, not necessary the actual transfer rate obtained by the user/subscriber. In fact, the user/subscriber will often find that their transfer rate is well below that of their selected rate due to network delays and congestion. Yet at other times, when the network resources are underused, the user/subscriber may obtain a transmission rate close to or at their selected transfer rate.

Figure 4B:
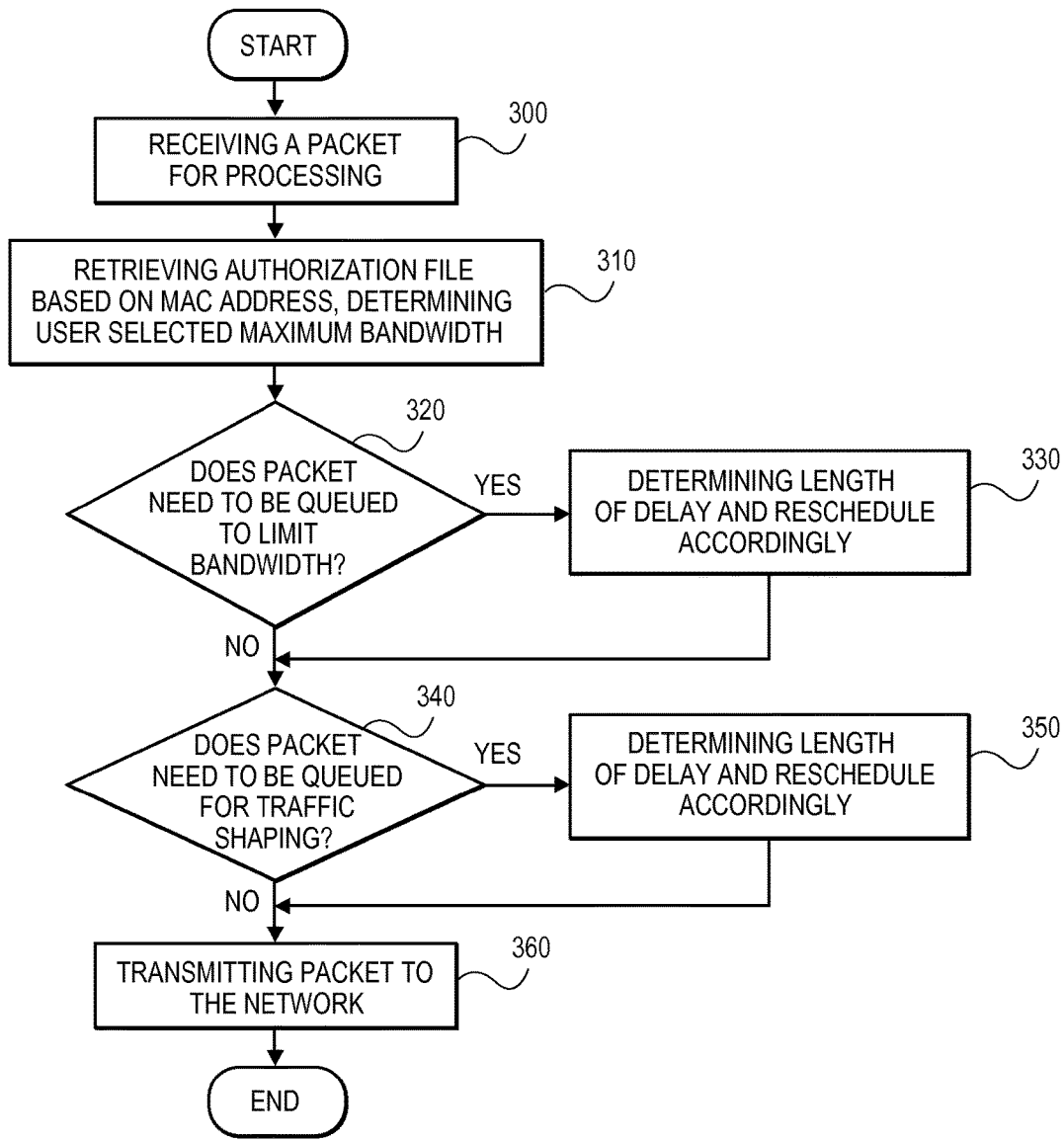

In FIG. 4B, the operation of an embodiment of the bandwidth manager on the data packets being delivered upstream to the network is provided. In particular, at block 300, a new data packet is received for processing at a gateway device or similar network interface. At block 310, the data packet is processed by extracting the MAC address from the data packet and retrieving the authorization file associated therewith, preferably from a hash table embodied with a AAA service. Based upon (a) the predetermined bandwidth chosen by the subscriber as determined from the authorization file; (b) the size of the current data packet; and/or (c) the size and time of the previous packet sent by the subscriber and processed at the bandwidth manager, it is determined if the packet needs to be queued for a period of time to ensure that the subscriber does not receive a bandwidth greater than that which the subscriber selected, as determined at decision block 320. If the packet should be delayed, then at block 330, the appropriate delay is calculated and the packet is placed in the appropriate timeslot of a ring buffer. When the pointer of the ring buffer addresses the times lot in which the packet resides, then the packet is further processed by the traffic shaping module of the bandwidth manager. In particular, at block 340, it is determined if the packet needs to be queued for traffic shaping purposes. If the packet needs to be queued, then it is determined at block 350 how long the packet should be delayed, and then the packet is placed in the appropriate timeslot of the ring buffer. When the pointer of the ring buffer addresses the timeslot where the packet resides, then the packet is transmitted over the network at block 360.

Figure 5:
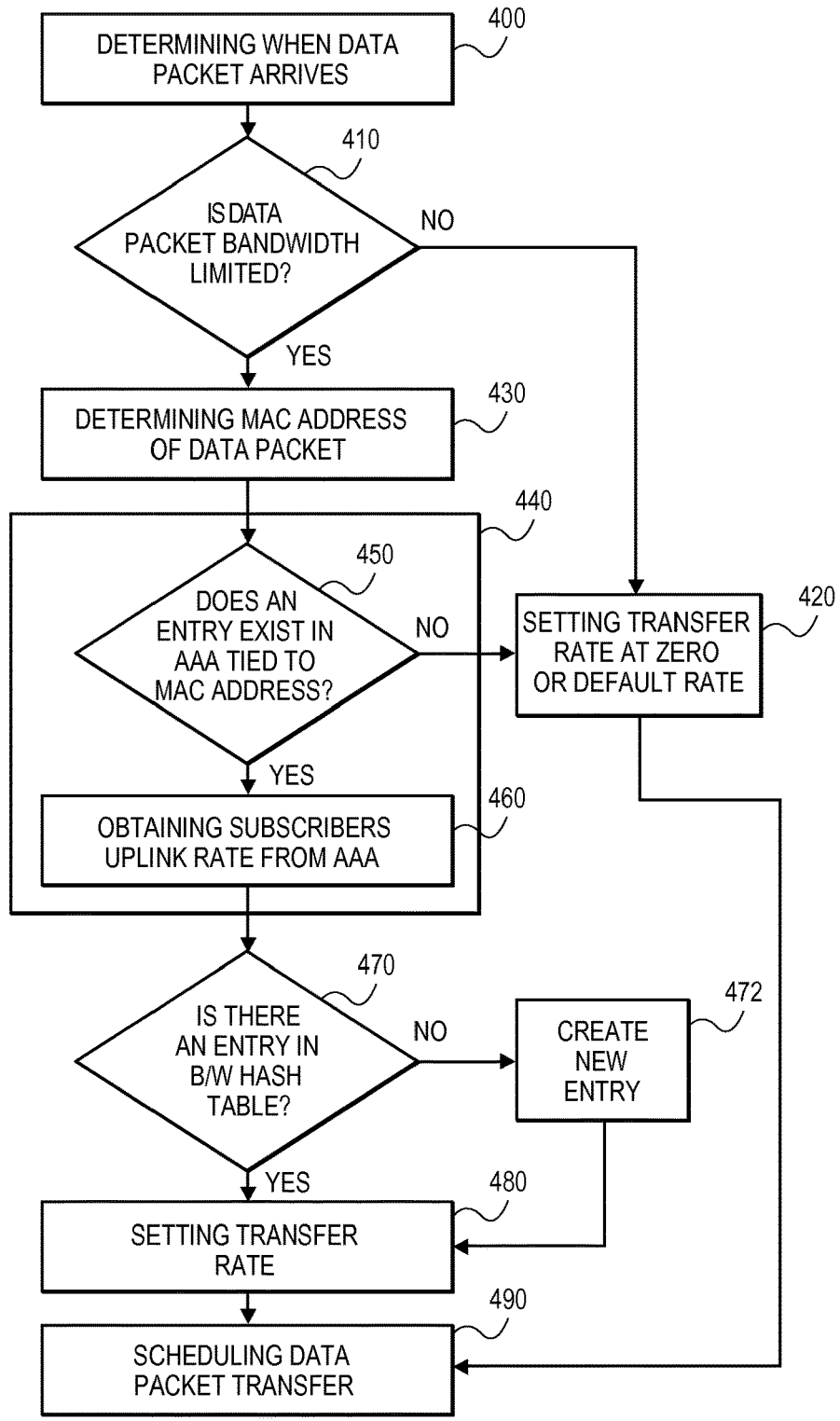
FIG. 5 is a flowchart diagram of a method for determining bandwidth for data being transmitted from host to network service, in accordance with an embodiment of the present invention.

FIG. 5 is a detailed flow diagram of the operation of the bandwidth manager in preparing data packets for transmission to an upstream network, in accordance with an embodiment of the present invention. At block 400 the time at which the data packet arrives at the gateway device is determined. The time of arrival is necessary if delay periods are to be determined and implemented for a given data packet. At block 410 the gateway device determines whether the data packet is bandwidth limited. If a determination is made that the data packet is not bandwidth limited then, at block 420, the transfer rate is set to zero so that no delay period is assigned to that data packet. If a determination is made that the data packet is bandwidth limited then, at block 430, the MAC address of the data packet is determined so that the data packet can be associated with the host from which it was sent. In this fashion, the subscriber, or more specifically the subscriber's host, can be identified.

At block 440, the gateway device accesses a database, typically an AAA service, to obtain a subscriber profile associated with the MAC address. An initial determination is made, at block 450, as to whether a profile exists in the database associated with the MAC address. If no profile is found in the database then an error message is returned to the subscriber and the default mechanism sets the transfer rate to the default rate, in accordance with block 420. If a profile is found in the database then, at block 460 the subscriber's uplink transfer rate is obtained from the profile. The gateway device then makes a determination, at block 470, as to whether there is an entry in a short term memory module that tracks the subscriber's current uplink transfer rate. In the instance where no entry currently exists, typically this entry is the first or the operation has been timed out, then, at block 472, an entry in the memory module, typically a hash table, is created. Once a determination is made that an entry already exists in the memory module or an entry is created then, at block 480, the transfer rate is set and, at block 490 the data packet is scheduled for transmission in accordance with the transfer rate that has been set.

Figure 6:
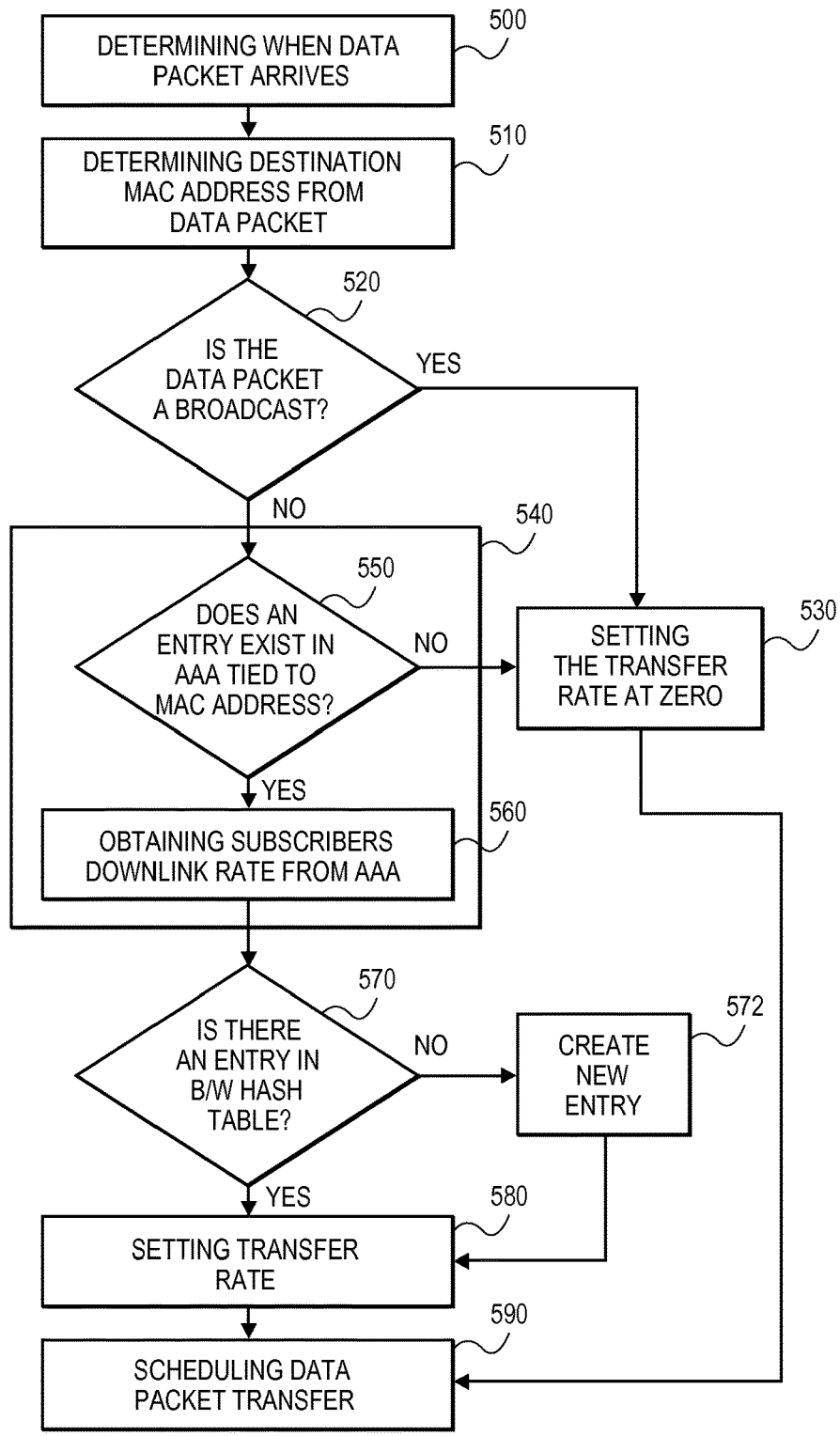
FIG. 6 is a flowchart diagram of a method for determining bandwidth for data being transmitted from a network service to a host, in accordance with an embodiment of the present invention.

FIG. 6 is a detailed flow diagram of the operation of the bandwidth manager in preparing data packets for transmission from the network to the downstream host, in accordance with an embodiment of the present invention. At block 500 the time at which the data packet arrives at the gateway device is determined. The time of arrival is necessary if delay periods are to be determined and implemented for a given data packet. At block 510, the destination MAC address of the data packet is determined so that the data packet can be associated with the host from which it will be sent to. In this fashion, the receiving subscriber, or more specifically the subscriber's host, can be identified. At block 520 the gateway device determines whether the data packet is a broadcast (i.e. audio, video or the like) data packet. If a determination is made that the data packet is a broadcast data packet then, at block 530, the transfer rate is set to zero so that no delay period is assigned to that data packet.

If a determination is made that the data packet is not a broadcast data packet then, at block 540, the gateway device accesses a database, typically an AAA service, to obtain a subscriber profile associated with the destination MAC address. An initial determination is made, at block 550, as to whether a profile exists in the database associated with the destination MAC address. If no profile is found in the database then an error message is returned to the subscriber and the default mechanism sets the transfer rate to the default rate, in accordance with block 530. If a profile is found in the database then, at block 560 the subscriber's downlink transfer rate is obtained from the profile. The gateway device then makes a determination, at block 570, as to whether there is an entry in a short term memory module that tracks the subscriber's current downlink transfer rate. In the instance where no entry currently exists, typically this entry is the first or the operation has been timed out, then, at block 572, an entry in the memory module, typically a hash table, is created. Once a determination is made that an entry already exists in the memory module or an entry is created then, at block 580, the downlink transfer rate is set and, at block 590 the data packet is scheduled for transmission in accordance with the transfer rate that has been set.

Figure 7:
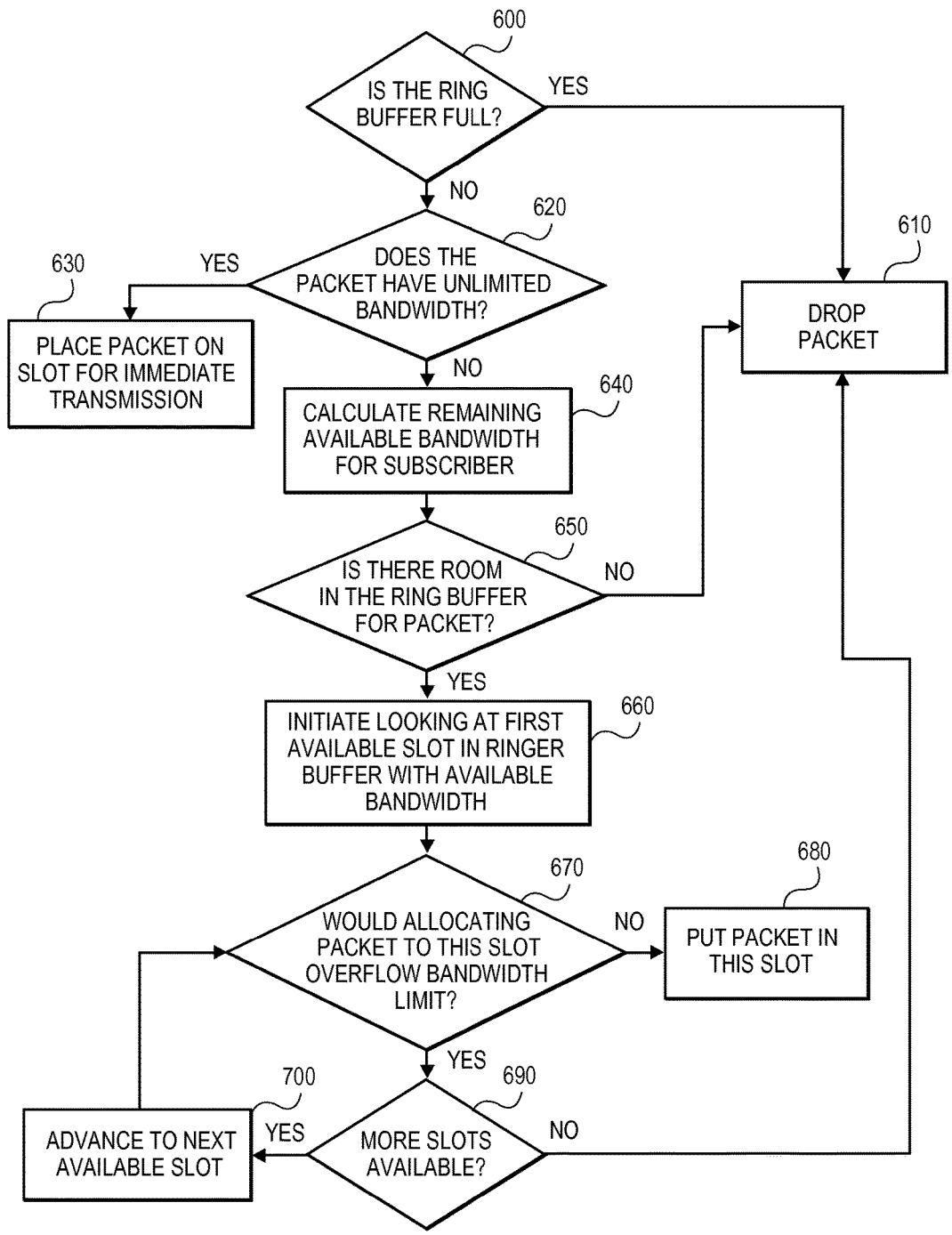
FIG. 7 is a flowchart diagram of a method for scheduling data packets for delivery, in accordance with an embodiment of the present invention.

FIG. 7 is a detailed flow diagram of the process by which data packets are queued for transmission as a means for providing bandwidth management to a subscriber in a communications network, in accordance with an embodiment of the present invention. At block 600 a determination is made whether the ring usage exceeds the maximum ring usage capacity. If the maximum ring usage capacity is exceeded (i.e. the ring is overflowed) then, at block 610, the packet is dropped and no further processing occurs. If the maximum ring usage capacity is not exceeded the, at block 620, a determination is made as to whether the packet has unlimited bandwidth. For example, media packets will typically be designated as having unlimited bandwidth. If the packet is determined to be designated as having unlimited bandwidth then, at block 630, the data packet is queued for immediate transmission by setting the slot to the current slot being transmitted. If the determination is made that the data packet is not designated for unlimited bandwidth then, at block 640, a calculation is made to quantify the difference between the bandwidth available to the subscriber and the bandwidth currently being used (i.e. the remaining available bandwidth for the subscriber).

At block 650, it is determined if there is room in the ring buffer for the data packet. If there is no room in the ring buffer then the packet is dropped at block 610. If there is room then, at block 660, the bandwidth management module initiates looking at the first available slot in the ring buffer with available bandwidth. At block 670, a determination is made as to whether allocating the data packet to ring buffer slot that is currently being looked at would overflow the bandwidth limit of that particular slot. If it does not overflow the slot then, at block 680, the data packet is inserted into the slot. If it would overflow the slot then, at block a determination is made as to whether more slots are available. If no more slots are available then, at block 610, the data packet is dropped (i.e. no further processing). If further slots are available then, at block 700, the pointer advances to the next available slot in the ring buffer. An overflow assessment is made at block 670 and the iterative process continues until the data packet is placed in a slot with sufficient available capacity or until the data packet is dropped.

The subscriber bandwidth management process and device of the present invention allows users/subscribers in a communications network to dynamically alter bandwidth limits independently in both the uplink and downlink data transmission paths. This is accomplished by providing for a single queue in the uplink transmission path and a single queue in the downlink transmission path. Thus, the user/subscriber can efficiently manage their network access according to the specific activity on the network. The network manager benefits from being able structure bandwidth allocation on a per subscriber basis so that overall data transmission is made more efficient. In addition, the bandwidth manager provides active management of the delivery of data (also known as and referred to herein as traffic shaping) to increase throughput from the gateway device onto the network.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A bandwidth management system configured to allow users to dynamically request an amount of bandwidth and further configured to maintain a minimum level of bandwidth for the users, the bandwidth management system comprising:
   a hardware memory configured to store one or more queues;
   one or more first network interfaces configured to receive a plurality of packets;
   a controller configured to:

determine a class of service associated with at least some of the received plurality of packets based on user selection of requested bandwidth or requested connection speed;

add each of the at least some of the received plurality of packets in the one or more queues according to the determined class of service; and remove one or more outgoing packets associate with a user from the one or more queues based on a quality of service metric determined for the user; and one or more second network interfaces configured to transmit the one or more outgoing packets removed from the one or more queues, wherein the controller is further configured to delay transmission of the one or more outgoing packets to prevent the user's network enabled device from achieving a bandwidth or connection speed greater than the requested bandwidth or the requested connection speed.

2. The bandwidth management system of claim 1, wherein the quality of service metric comprises a minimum bandwidth or minimum connection speed associated with the user.

3. The bandwidth management system of claim 1, wherein the quality of service metric comprises a measured bandwidth or measured connection speed associated with the user.

4. The bandwidth management system of claim 1, wherein the controller is further configured to monitor throughput at the one or more first network interfaces or the one or more second network interfaces, wherein the throughput is related to the quality of service metric.

5. The bandwidth management system of claim 1, wherein the controller is further configured to use at least one of weighted fair queuing, deficit round robin, or random early detection schemes for the adding or the removing of packets from the one or more queues.

6. The bandwidth management system of claim 1, wherein the controller is further configured to add or remove packets from the one or more queues based on load associated with the one or more queues.

7. The bandwidth management system of claim 1, wherein the controller is further configured to present to the user's network enabled device display content that enables the user to select one of a plurality of network connection parameters including a bandwidth parameter amongst two or more available bandwidth parameters.

8. The bandwidth management system of claim 7, wherein the display content is a home page.

9. The bandwidth management system of claim 1, wherein the bandwidth management is performed substantially in real-time and without requiring hardware reconfiguration of any component in a network.

10. A method of managing bandwidth including allowing users to dynamically request an amount of bandwidth and maintaining a minimum level of bandwidth for the users, the method comprising:

storing one or more queues;

receiving a plurality of packets;

determining a class of service associated with at least some of the received plurality of packets based on user selection of requested bandwidth or requested connection speed;

adding each of the at least some of the received plurality of packets in the one or more queues according to the determined class of service; and removing one or more outgoing packets associated with a user from the one or more queues based on a quality of service metric determined for the user; and transmitting the one or more outgoing packets removed from the one or more queues, wherein the transmission of the one or more outgoing packets is delayed to prevent the user's network enabled device from achieving a bandwidth or connection speed greater than the requested bandwidth or the requested connection speed.

11. The method of claim 10, wherein the quality of service metric comprises a minimum bandwidth or minimum connection speed associated with the user.

12. The method of claim 10, wherein the quality of service metric comprises a measured bandwidth or measured connection speed associated with the user.

13. The method of claim 10, further comprising monitoring throughput at the one or more first network interfaces or the one or more second network interfaces, wherein the throughput is related to the quality of service metric.

14. The method of claim 10, wherein the adding or the removing of packets from the one or more queues comprises using at least one of weighted fair queuing, deficit round robin, or random early detection schemes.

15. The method of claim 10, further comprising adding or removing packets from the one or more queues based on load associated with the one or more queues.

16. The method of claim 10, further comprising presenting to the user's network enabled device display content that enables the user to select one of a plurality of network connection parameters including a bandwidth parameter amongst two or more available bandwidth parameters.

17. The method of claim 16, wherein the display content is a home page.

18. The method of claim 10, wherein the bandwidth management is performed substantially in real-time and without requiring hardware reconfiguration of any component in a network.

\* \* \* \* \*